United States Patent
Li et al.

(10) Patent No.: US 6,633,317 B2
(45) Date of Patent: Oct. 14, 2003

(54) IMAGE-BASED WALKTHROUGH SYSTEM AND PROCESS EMPLOYING SPATIAL VIDEO STREAMING

(75) Inventors: Jiang Li, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 09/754,101

(22) Filed: Jan. 2, 2001

(65) Prior Publication Data

US 2002/0113805 A1 Aug. 22, 2002

(51) Int. Cl.$^7$ ................................................. G09G 5/00
(52) U.S. Cl. ........................................ 345/854; 345/649
(58) Field of Search ................................. 345/649, 854

(56) References Cited

U.S. PATENT DOCUMENTS

| | | | | |
|---|---|---|---|---|
| 5,721,565 A | * | 2/1998 | Nguyen | 345/660 |
| 6,157,747 A | * | 12/2000 | Szeliski et al. | 382/284 |
| 6,359,617 B1 | * | 3/2002 | Xiong | 345/848 |
| 6,369,812 B1 | * | 4/2002 | Iyriboz et al. | 345/419 |
| 6,388,688 B1 | * | 5/2002 | Schileru-Key | 345/854 |
| 6,486,877 B1 | * | 11/2002 | Watanabe | 345/420 |

* cited by examiner

*Primary Examiner*—Joseph Mancuso
*Assistant Examiner*—Adam Arnold
(74) *Attorney, Agent, or Firm*—Lyon & Harr, LLP; Richard T. Lyon

(57) ABSTRACT

An image-based walkthrough system and process that employs pictures, panoramas, and/or concentric mosaics captured from real scenes to present a photo-realistic environment to a viewer. In general, a walkthrough space is divided into a horizontally sectioned grid. Each cell of the grid is assigned at least one source of image data from which an image of a part or all of the surrounding scene as viewed from that cell can be rendered. Whenever the viewer moves into one of the grid cells, the distance between the viewer's currently selected viewing position in that cell, and each picture viewpoint, panorama center, and nearest concentric mosaic wandering circle point, in the cell and its neighboring cells, is computed. An image depicting the scene as would be viewed from the point associated with the closest image data source is then rendered and displayed to the viewer.

50 Claims, 11 Drawing Sheets

IMAGE-BASED WALKTHROUGH SYSTEM AND PROCESS EMPLOYING SPATIAL VIDEO STREAMING

BACKGROUND

1. Technical Field

The invention is related to a virtual walkthrough system and process, and more particularly to an image-based walkthrough system and process that employs pictures, panoramas, and/or concentric mosaics captured from real scenes to present a photo-realistic environment to a viewer locally and/or over a network environment.

2. Background Art

Rapid expansion of the Internet has enabled a number of interesting applications related to virtually wandering in a remote environment, e.g. online virtual tours, shopping, and games. Traditionally, a virtual environment is synthesized as a collection of 3D geometrical entities. These geometrical entities are rendered in real-time, often with the help of special purpose 3D rendering engines, to provide an interactive walkthrough experience. The Virtual Reality Modeling Language (VRML) [1] is presently a standard file format for the delivery of 3D models over the Internet. Subsequently, efforts have been made to effectively compress and progressively transmit the VRML files over the Internet [2, 3, 4, 5].

The 3D modeling and rendering approach has several main problems. First, it is very labor-intensive to construct a synthetic scene. Second, in order to achieve a real-time performance, the complexity and rendering quality are usually limited by the rendering engine. Third, the requirement of certain accelerating hardware limits the wide application of the approach.

Recently developed image-based modeling and rendering techniques [6, 7] have made it possible to simulate photo-realistic environments. The advantages of image-based rendering methods are that the cost of rendering a scene is independent of the scene complexity and truly compelling photo-realism can be achieved since the images can be directly taken from the real world. One of the most popular image-based rendering software is Apple Computer's QuickTime™ VR [7]. QuickTime™ VR has its roots in branching movies, e.g., the movie-map [8], the Digital Video Interactive (DVI) [9], and the "Virtual Museum" [10]. QuickTime™ VR uses cylindrical panoramic images to compose a virtual environment, therefore provides users an immersive experience. However it only allows panoramic views at separate positions.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3, 4, 5]. A listing of the publications corresponding to each designator can be found at the end of the Detailed Description section.

SUMMARY

The present invention is directed toward an image-based walkthrough system and process that employs pictures, panoramas, and/or concentric mosaics captured from real scenes to present a photo-realistic environment to a viewer. This is generally accomplished by dividing a walkthrough space that is made available to the viewer for exploring into a horizontally sectioned grid. The viewer is allowed to "walk" through the walkthrough space and view the surrounding scene from a horizontal plane in the space. In doing so, the viewer "enters" and "exits" the various cells of the grid. Each cell of the grid is assigned at least one source of image data from which an image of a part or all of the surrounding scene as viewed from that cell can be rendered. Specifically, each cell is associated with one or more pointers to sources of image data, each of which corresponds to one of the aforementioned pictures, panoramas or concentric mosaics.

In the case where the image data is a picture, its pointer will be associated with the location in the cell corresponding to the viewpoint from which the picture was captured. Similarly, a pointer to panoramic image data will be associated with the location in the cell corresponding to the center of the panorama. And when the image data represents a concentric mosaic, the pointer is associated with the region of the cell corresponding to the portion of the wandering circle of the concentric mosaic contained within the cell. It should be noted that unlike a panorama and picture, a concentric mosaic could be associated with more than one cell of the walkthrough space since its wandering circle could encompass more than one cell.

Whenever the viewer moves into one of the grid cells, the pointers associated with that cell, as well as the pointers associated with the adjacent cells (e.g., the eight neighboring cells assuming square or rectangular-shaped cells), are considered. Specifically, the distance between the current location of the viewer, and each picture viewpoint, panorama center, and nearest wandering circle point, in the considered cells is computed. If the viewer's current location is within the wandering circle of a concentric mosaic, then no action is taken to shift the viewer's position. However, if the viewer's current position is not within such a wandering circle, the viewer is slotted onto the closest of these aforementioned points.

In general, the foregoing image-based rendering technique for providing a continuous walkthrough experience to a viewer would require a large number of images, and so the transfer of a large amount of image data between the device employed to store the data and the processor used to render the images. If the image data is stored locally, such as on a hard drive, or on a CD or DVD, which is directly accessible by the processor, then the requirement to transfer large amounts of image data is of little concern. However, walkthrough systems are often implemented in a network environment (e.g., the Internet) where the image data is stored in or directly accessible by a network server, and the processor used to render the images is located in a network client. In such a network environment the large amount of image data that needs to be transferred between the server and client is a concern as bandwidths are typically limited.

In order to overcome the bandwidth limitations in network environments, the present invention is additionally directed toward a unique image data transfer scheme that involves streaming the image data so that the viewer can move around in the virtual environment while downloading. Similar to other network streaming techniques, this new streaming technology cuts down the waiting time for the viewer. Furthermore, the viewer can interactively move in the environment, making the waiting less perceptible. In general the new transfer scheme allows the client to selectively retrieve image segments associated with the viewer's current viewpoint and viewing direction, rather than transmitting the image data in the typical frame by frame manner. Thus, the server is used to store the huge amount of image data, while the client is designed to interact with the viewer and retrieve the necessary data from the server. This selective retrieval is achieved by implementing a new client-server communication protocol. Additionally, cache strategies are designed to ensure a smooth viewing experience for the viewer by capturing the correlation between subsequent views of a scene.

In essence, the new transmission scheme characterizes pictures and panoramas similar to a concentric mosaic in that each is represented by a sequence of image columns. As with the concentric mosaics each image column can be of any width, but typically will be the width of one pixel, making the image column a column of pixels. To facilitate the transfer of the image data, whether it be in the form of a picture, panorama or concentric mosaic, a specialized server-side file structure is employed. This structure includes a file header, or a separate tag file, which provides descriptive information about the associated image data. It is also noted that the image data may be compressed to facilitate its efficient transfer over the network. The type of compression used should allow for random access and quick selective decoding of the image data. The aforementioned headers or tag files would include information needed to assist the client in decompressing the incoming image data.

As indicated previously, the client-server scheme according to the present invention involves an interactive client-server approach where the client selectively retrieves image segments associated with the viewer's current viewpoint and viewing direction. In other words, rather than waiting for the particular frames of a time-sequence of frames that contain the image data needed to render the desired view of the scene to arrive, the actual image data needed to render the view is requested and sent. This transmission process, dubbed spatial video streaming, is accomplished as follows. First, the client tracks the movements of the viewer within the walkthrough space. For each new position of the viewer, the coordinates of the position are provided over the network to the server. The server determines which picture viewpoint, panorama center, and wandering circle point is nearest to the coordinates provided by the client. The server then sends out the description information associated with the closest source of image data. This information includes an indicator of the type of image data file, i.e. picture, panorama, or concentric mosaics, and the header (or tag file) information associated with the image data file. It also includes the walkthrough space coordinates of the closest source. If these coordinates are different from the viewer's current location, the client "transports" the viewer into the source coordinates. As the grid cells are relatively small, this change in location will probably be imperceptible to the viewer. Next, the client allocates buffers to store the image data, and then requests the image columns that are needed to render the image corresponding to the viewing position and direction selected by the viewer. The image columns are preferably requested in order of their importance. To this end, the image columns that are needed to render the viewer's image are requested from the center of this image (which corresponds to the viewing direction) outward, in an alternating pattern.

Whenever the server receives a request for an image column, it sends the requested column in compressed or uncompressed form to the requesting client. If the image column data is compressed, as it typically would be for transfer over a network, the client would decompress the data upon its receipt and use it to construct the viewer's image. The client then displays the image to the viewer.

It was mentioned above that the client allocates buffers to store the incoming image data. This can be accomplished using a full cache strategy, especially when the amount of image data needed to render the entire scene is small enough to be readily stored by the client. In such a case, the data associated with the whole scene is streamed to the client and stored. Of course, any requested data would be provided first and the rest sent as time permits. In this way, eventually the whole scene will be stored by the client. The client would check the stored data before requesting an image column to ensure it has not already been sent. If the required column is already in storage, it is simply retrieved. If the required column is not found in the client's memory, then the request is made to the server as described previously.

The second approach uses a partial cache scheme. This scheme is preferred when either the memory space of the client is very small such as in mobile devices, or when the amount of the image data is so large (e.g., concentric mosaics) that transmitting and storing all of it is impractical. In the partial cache scheme, two initially equal-sized buffers are allocated in the client's memory. The initial size of these buffers is made large enough to store the data associated with the number of image column needed to render a full 360 degree view of the scene around the viewer's current position in the walkthrough space and at the viewer's current zoom level (i.e., current lateral field of view). The reason for this is that the client continues to request image columns in the aforementioned alternating fashion even when all the columns necessary to render the current image of the scene to the viewer have been requested. Thus, in the case of panorama or concentric mosaic image data, enough image columns to render a full panoramic view of the scene surrounding the viewer's current position could eventually be transferred. This data would be entirely stored in one of the two buffers. The continuing request procedure has the advantage of providing, ahead of time, the image data that the client would need to render images of the entire scene surrounding the viewer's current location. Thus, a viewer could rotate their viewing direction about the same viewpoint in the walkabout space and be presented images of the surrounding scene on nearly a real-time basis. The only time this would not be true is when the viewer rotates their viewing direction too quickly into a region of the scene associated with image columns that have not yet been received by the client. To minimize the occurrence of such an event, the requesting process changes any time the viewer rotates their viewing position. Specifically, rather than employing the aforementioned alternating request procedure, the client immediately begins requesting successive image columns in the direction the viewer is rotating, and stops requesting columns in the direction opposite the viewer's rotation. Should the viewer change his or her direction of rotation, this same-direction requesting procedure would be repeated, except in the opposite rotation direction. The same-direction requesting procedure continues until all the available image columns are exhausted (such as when the image data is in the form of a picture), or when all the image columns needed to provide a 360 degree view of the scene have been requested.

The viewer is not limited to just rotating his or her viewing direction around the same viewpoint. Rather, the viewer can also change positions (i.e., translate within the walkthrough space), or zoom in to or zoom out from a current view of the scene. In the case of the viewer changing viewpoints, the client-server interaction described above is simply repeated for the new location, with the exception that the second buffer comes into play. Specifically, rather than requesting the server to provide every image column needed to produce the new view of the scene to the viewer, it is recognized that some of the columns may have already been sent in connection with the previous viewpoint. Accordingly, before requesting an image column from the server, the client checks the first buffer to determine if the column has already been received. If so, it is copied to the second buffer. If not, it is requested from the server. As soon as the image columns needed to render the image of the scene for the new viewpoint have been received, the screen is refreshed and the view of the new position is displayed to the viewer. The coordination between the buffers is repeated everytime the viewer moves to a new viewpoint in the walkthrough space, except the buffers exchange roles each time. In this way, devices with limited storage capacity can still provide a realistic walkthrough experience.

In the case of where the viewer zooms into or out of the currently depicted portion of the scene, the two-buffer scheme also comes into play. Specifically, the second buffer is used to gather the image columns needed to present the zoomed image to the viewer. However, it is noted that when the viewer's lateral field of view decreases as when the viewer zooms in, the result is the need for more image columns to provide the same-dimensioned image to the viewer. Thus, in the case where the image data is associated with a panorama or concentric mosaic, the size of the "receiving" buffer must be increased to accommodate the additional image data that will be needed to store the entire panoramic view of the scene from the selected viewing position at the new zoom level. Once the buffer size has been increased, the process of copying and requesting the needed image column is the same as described previously.

Another aspect of the image column requesting process involves building up additional or "secondary" buffers of image data in an attempt to anticipate the next change in the viewer's viewpoint within the walkthrough space. Thus, assuming the client has sufficient available storage space, additional buffers could be created and filled whenever the client and server are not busy providing image data to fill the active one of the two aforementioned "primary" buffers. Each of the new buffers would contain the image columns needed to render images of the surrounding scene from a different viewpoint. Preferably, buffers associated with the image data corresponding to viewpoints immediately adjacent the current viewpoint would be filled first, with subsequent buffers being filled with image data associated with viewpoints radiating progressively out from the current viewpoint. These new buffers would be filled in the same way as the first buffer described above, with the exception the viewing direction would be assumed to be the central viewing direction if picture data is involved, the starting direction if panorama data is involved, and the starting direction corresponding to the central viewing direction of the first image captured in a concentric mosaic. As with the two-buffer scheme, the viewer may change viewpoints during the process of building up the secondary buffers. In that case, the current requesting procedure is terminated, and the requesting process to fill the active primary buffer and any additional buffers is begun again for the new viewpoint. This process would include searching the existing buffers for previously stored image columns before requesting them from the server.

Finally, it is noted that while the foregoing image data transfer scheme was described in connection with its use with the above-described walkthrough system, it could also be implemented with other walkthrough systems. For example, the new transmission scheme would be particularly useful in conjunction with a walkthrough system employ one or several interconnected concentric mosaics.

In addition to the just described benefits, other advantages of the present invention will become apparent from the detailed description which follows hereinafter when taken in conjunction with the drawing figures which accompany

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
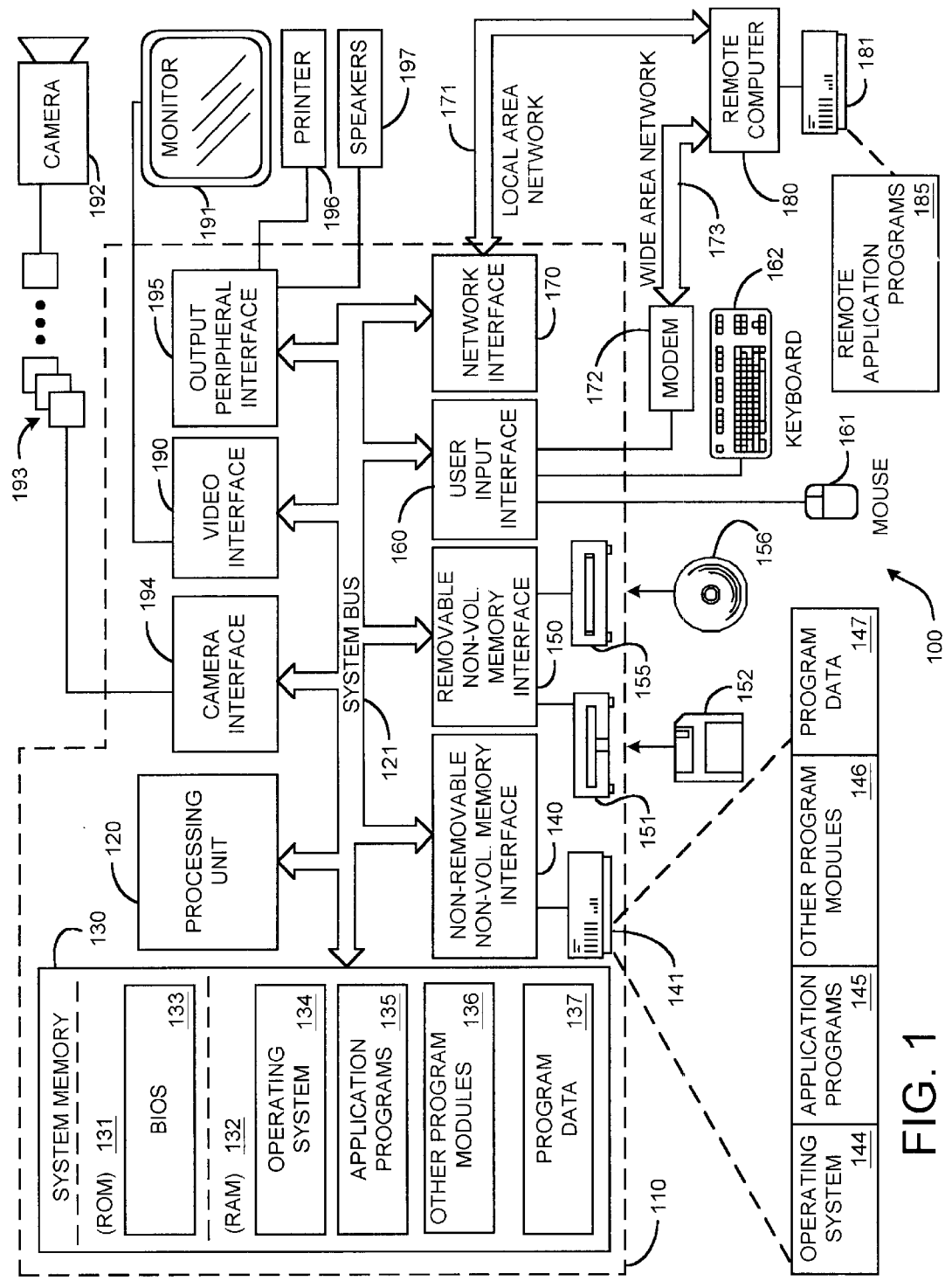
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

1.0 The Walkthrough System

Figure 2:
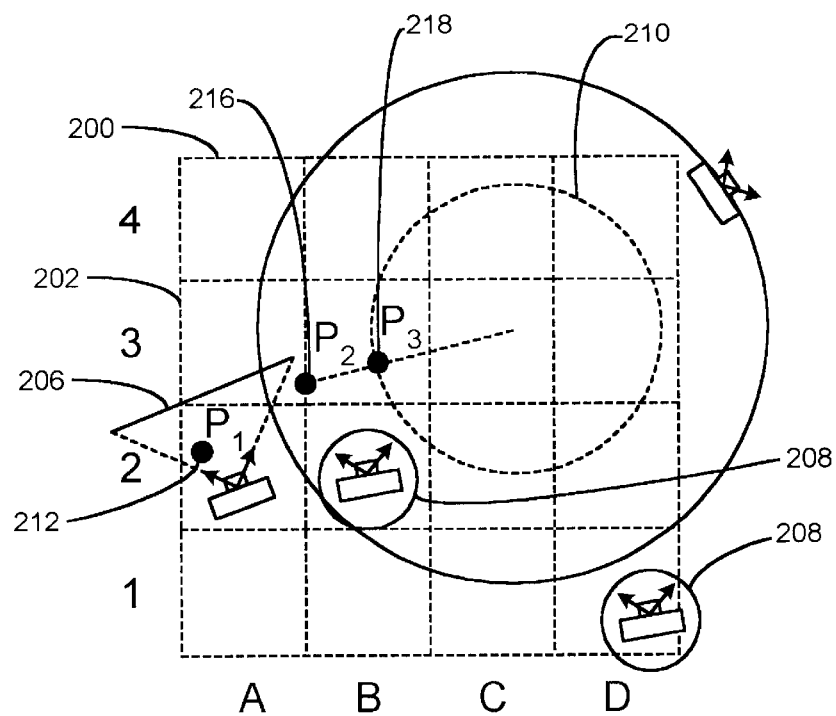
FIG. 2 is a diagram depicting a top view of a portion of the walkthrough space showing a part of the horizontal grid and various representations of image data in the form of pictures, panoramas and concentric mosaics.
Figure 3A:
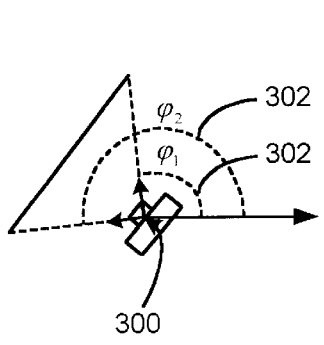
FIGS. 3A through 3C are diagrams depicting representations of image data in the form of a picture, panorama and concentric mosaic, respectively.
Figure 3B:
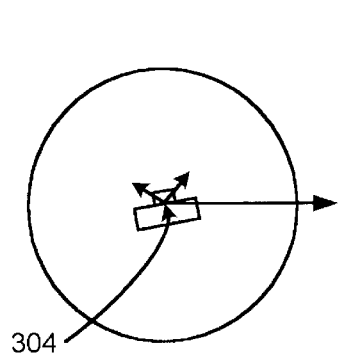
Figure 3C:
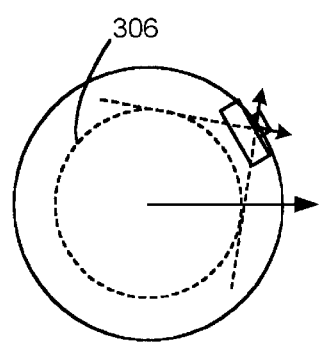

The exemplary operating environment having now been discussed, the remaining part of this description section will be devoted to a description of the program modules embodying the invention. The present invention involves an image-based walkthrough system and process that employs pictures, panoramas, and/or concentric mosaics [11] captured from real scenes to present a photo-realistic environment to a viewer. In general, this is accomplished as follows. Referring to FIG. 2, a walkthrough space 200 is established. This walkthrough space is a virtual space having any desired dimensions, limited only by the image data available as will be seen. The viewer can select a viewing position anywhere on a prescribed horizontal plane of the walkthrough space, as well as a viewing direction for viewing the surrounding scene from that position. The walkthrough space is cordoned off into a horizontally sectioned grid 202. Thus, as the viewer "moves" about in the walkthrough space, he or she enters and exits the various cells of the grid 202. Each cell of the grid 202 is assigned at least one source of image data from which a view of a part or all of the surrounding scene as viewed from that cell can be rendered. It is noted that only a few of the image data sources associated with the cells of the walkthrough space grid are shown in FIG. 2. Specifically, the aforementioned assignment is accomplished by associating each cell with one or more pointers to various sources of image data. As indicated previously, the data sources can be either pictures 206, panoramas 208 or concentric mosaics 210. As best illustrated in FIGS. 3A through 3C, in the horizontal plane, a picture (FIG. 3A) records light rays that reach a point 300 between certain azimuth angles 302 such as $\Phi_1$ and $\Phi_2$; a panorama (FIG. 3B) records light rays that reach a point 304 from directions of 360 degrees; and concentric mosaics (FIG. 3C) record light rays that reach a circular region 306 referred to as a wandering circle (as depicted within the dotted circle in FIG. 3C). In regard to a concentric mosaic, an image of the surrounding scene can be constructed from the image data from any point within the wandering circle [11]. The aforementioned pointers preferably point to memory locations containing files constituting a picture, panorama or concentric mosaic, as the case may be. The detailed file structures of these three types will be described later.

Referring once again to FIG. 2, each of the image data sources is associated with at least one point within the cell. For example, a picture 206 and panorama 208 would be associated with their respective capture points. These capture points correspond to the location in the walkthrough space 200 from which the image data of the picture or panorama can be used to produce an image of the surrounding scene (or a part thereof as it would appear to a viewer observing the scene from that location. In the case of a picture 206 the capture point corresponds to the fixed viewpoint of the camera and in the case of a panorama 208 the capture point corresponds to the center of the panorama. As for a concentric mosaic 210, it can be associated with multiple points in a cell. Specifically, it is associated with any point in a cell that is contained within the wandering circle of the concentric mosaic 210.

Whenever the viewer moves into one of the grid cells, the pointers associated with that cell, as well as the pointers associated with the adjacent cells (e.g., up to eight neighboring cells assuming square or rectangular-shaped cells), are considered. Specifically, the distance between the current location of the viewer, and each picture viewpoint, panorama center, and nearest wandering circle point, in the considered cells is computed. If the viewer's current location is within the wandering circle of a concentric mosaic, then no action is taken to shift the viewer's position. However, if the viewer's current position is not within such a wandering circle, the viewer is slotted onto the closest of these aforementioned points. For instance, referring to FIG. 2, if the viewer selects a viewing position ($P_1$) 212 in cell 2A of the grid 202, the closest point in the neighborhood of adjacent cells associated with a source of image data is the capture point 214 of the picture 206. Thus, the viewer will be mapped from $P_1$ 212 to the capture point 214 of the picture 206 in cell 2A. Similarly, if the viewer selects viewing position ($P_2$) 216 in cell 3B of the grid 202, the closest point in the neighborhood of adjacent cells associated with a source of image data is the point $P_3$ 218 on the wandering circle of the concentric mosaic 210. As such, the viewer will be mapped from $P_2$ 216 to $P_3$ 218.

Figure 4:
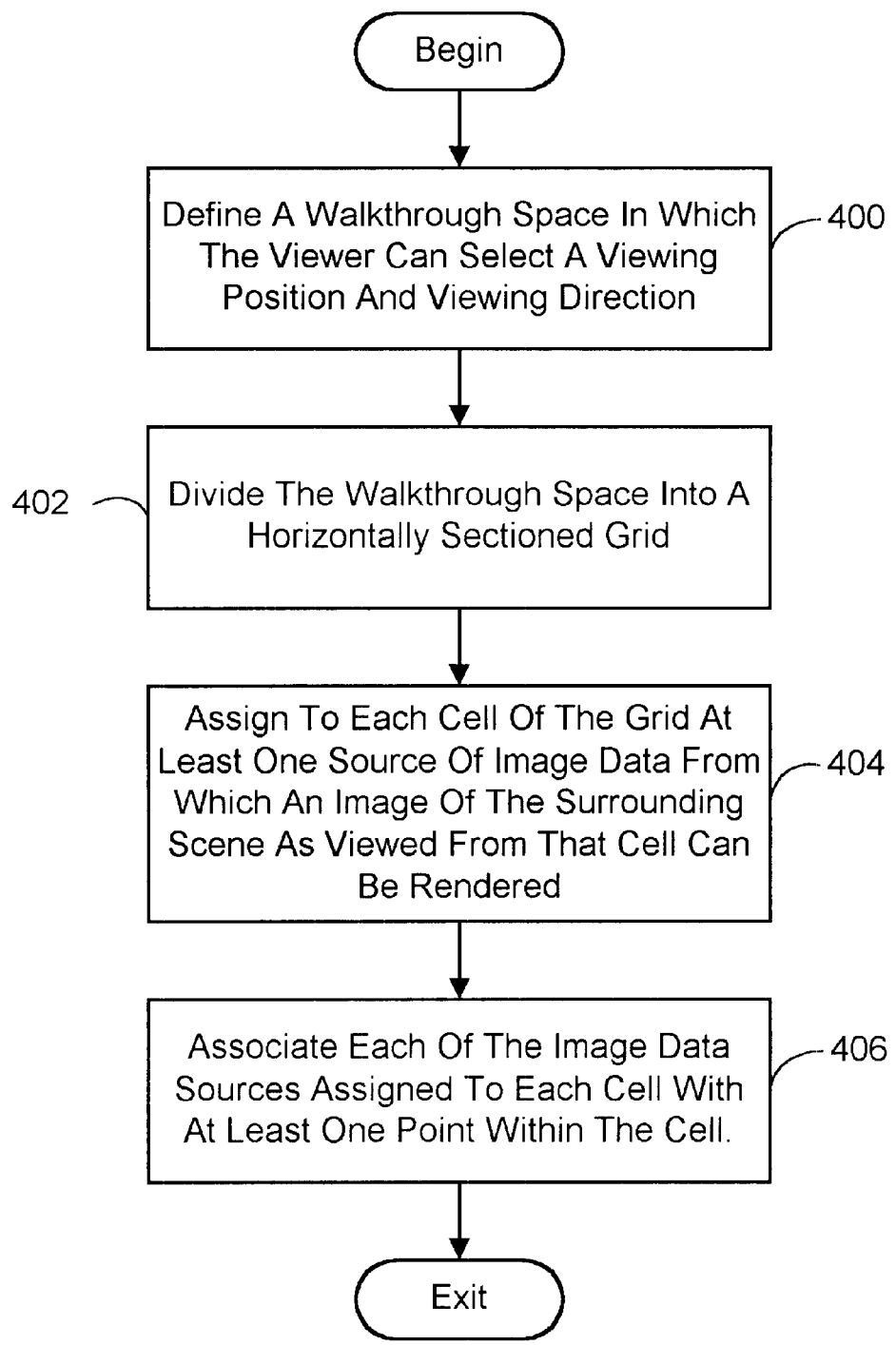
FIG. 4 is a flow chart diagramming an overall process for configuring a walkthrough space in accordance with the present invention.

Based on the foregoing description, the present walkabout system can be generally implemented as follows in reference to FIG. 4. First, a walkthrough space is defined in which the viewer can select a viewing position on a horizontal plane of the space and a viewing direction for viewing the scene (process action 400). The walkthrough space is divided into a horizontally sectioned grid (process action 402). As indicated in process action 404, each cell of the grid is assigned at least one source of image data from which a view of a part or all of the surrounding scene as viewed from that cell can be rendered. In addition, as indicated by process action 406, each of the image data sources assigned to a cell is associated with at least one point within the cell.

Figure 5:
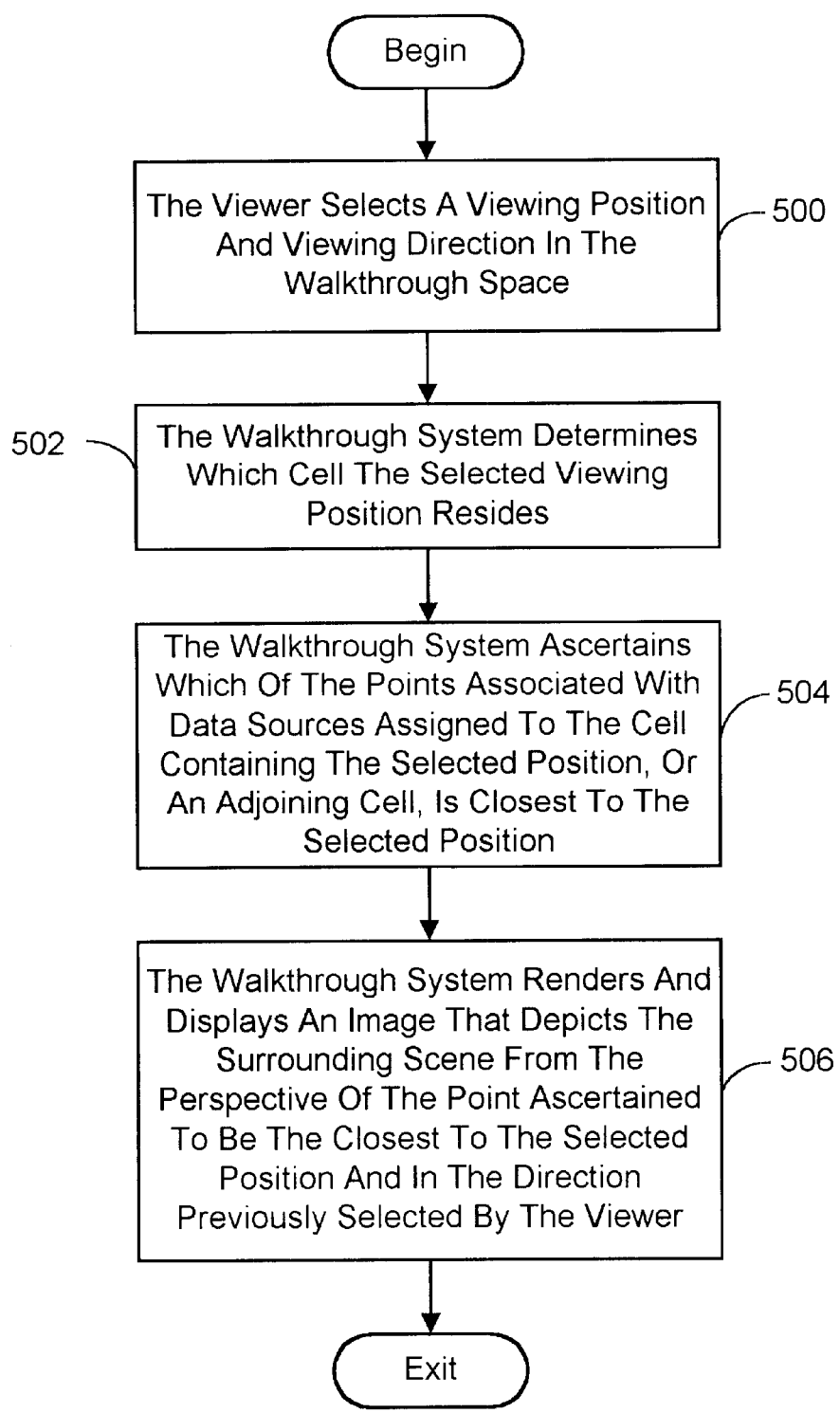
FIG. 5 is a flow chart diagramming an overall process in accordance with the present invention for using the walkthrough system to provide an image of the scene based on a viewer's selection of a viewing position and direction within the walkthrough space.

Referring now to FIG. 5, once the walkthrough system has been implemented, a viewer can select a viewing position on the aforementioned horizontal plane in the walkthrough space, as well as a viewing direction (process action 500). The walkthrough system then determines which cell the selected position resides (process action 502), and ascertains which of the points associated with data sources assigned to the cell containing the selected position, or an adjoining cell, is closest to the selected position (process action 504). Finally, an image is rendered and displayed to the viewer that depicts a portion of the surrounding scene from the perspective of the point ascertained to be the closest to the selected position and in the direction previously selected by the viewer (process action 506). This image is of course rendered from image data taken from the source associated with the ascertained closest point.

In the foregoing description it was indicated that the viewer "moves" through the walkthrough space by selecting a new viewpoint. While it would be possible to allow the viewer to select any location each time, this could result walkthrough experience characterized by a series of noticeable jumps. To prevent this, the viewer could be restricted to moving about the walkthrough space via a series of distance-limited steps designed to create a more realistic transit experience. However, if the step distance is made too small there is a possibility that the viewer would become trapped at a viewpoint. For example, in cases where the viewer's current viewpoint is the capture point of a picture of panorama, a step that is too small could result in a new desired viewpoint that is still closer to the previous capture point than to a point associated with any other source of image data. Thus, as described previously, the viewer would be slotted back to the previous viewpoint and would become trapped. In order to prevent the viewer from becoming trapped at a particular viewpoint, the minimum step size of the viewer's movements is preferably made to exceed the longest dimension of the grid cells. In this way, each step will always move the viewer to another cell. In most cases this will result in the viewer changing to a new point of view. However, to ensure that in all cases a step results in a new point of view being achieved, the following feature could be employed. Namely, when the viewer selects a new viewpoint which is outside the wandering circle of a concentric mosaic and between the capture points of pictures or panoramas (or both), and it is determined that the step will result in the viewer being slotted back to the last-selected viewpoint, the viewer would be warned to increase the step interval to avoid being trapped at the same capture point. Alternately, the system and process could be designed to automatically adjust the step interval in such situations to slot the viewer to the closest point associated with another image data source. In addition, the size of the grid cells is preferably made small enough so that the aforementioned minimum step size will not appear to the viewer as a series of jumps as the viewer moves through the walkthrough space. Instead each step would appear as if a smooth, contiguous transition has been made from one point of view to the next.

In contrast to the case where a step would result in a viewpoint outside the wandering circle of a concentric mosaic and between the capture points of pictures and panoramas, the step interval need not be restricted when the step selects a viewpoint within a wandering circle. As long as the viewer is moving within the wandering circle of a concentric mosaic, any step size can be employed. It does not matter if the viewer's next step takes them out of the current cell or not. In practice, the step size employed within a wandering circle of a concentric mosaic could be preselected and remain static. However, as any desired step size can be employed within the wandering circle, it could also be made adaptive. For example, the viewer can be invited to adjust his or her step interval continuously as long as the new viewing position remains within the wandering circle.

2.0 Transferring Image Data

In general, the foregoing image-based rendering technique for providing a continuous walkthrough experience to a viewer would require a large number of images, and so the transfer of a large amount of image data between the device employed to store the data and the processor used to render the images. If the image data is stored locally, such as on a hard drive, or on a CD or DVD, which is directly accessible by the processor, then the requirement to transfer large amounts of image data is of little concern. However, walkthrough systems are often implemented in a network environment (e.g., the Internet) where the image data is stored in or directly accessible by a network server, and the processor used to render the images is located in a network client. In such a network environment the large amount of image data that needs to be transferred between the server and client is a concern as bandwidths are typically limited. For example, in a typical Internet connection between a server and a client over conventional telephone lines, current modems are limited to data transfer rates not exceeding about 56 kbps. This is problematic because, for instance, it could require the transfer of dozens of megabytes of concentric mosaic image data to provide a realistic walkthrough experience, which could take several hours under the current average available bandwidth on the Internet with a standard 56K modem.

In order to overcome the bandwidth limitations in network environments, the present invention is additionally directed toward a unique image data transfer scheme that involves streaming the image data so that the viewer can move around in the virtual environment while downloading. Similar to other network streaming techniques, this new streaming technology cuts down the waiting time for the viewer. Furthermore, the viewer can interactively move in the environment, making the waiting less perceptible. In general the new transfer scheme allows the client to selectively retrieve image segments associated with the viewer's current viewpoint and viewing direction, rather than transmitting the image data in the typical frame by frame manner. Thus, the server is used to store the huge amount of image data, while the client is designed to interact with the viewer and retrieve the necessary data from the server. This selective retrieval is achieved by implementing a new client-server communication protocol. Additionally, cache strategies are designed to ensure a smooth viewing experience for the viewer by capturing the correlation between subsequent views of a scene.

2.1 Client-Server Communication Protocol

In essence, the new transmission scheme characterizes pictures and panoramas similar to a concentric mosaic in that each is represented by a sequence of image columns. As with the concentric mosaics each image column can be of any width, but typically will be the width of one pixel, making the image column a column of pixels. To facilitate the transfer of the image data, whether it be in the form of a picture, panorama or concentric mosaic, a specialized server-side file structure is employed, as mentioned earlier. More specifically, the file structure for a picture preferably includes a header that includes the position $P_c$ and direction $D_c$ at which the picture is taken (also referred to as the central viewing direction), the lateral field of view $\Phi_{fovc}$ and vertical field of view $\theta_{fovc}$ of the camera used to capture the picture, and the width $w_c$ and height $h_c$ of the image. The image data section of the picture file contains the pixel information organized by indexed image columns. Preferably, the image columns are assigned index numbers that begin at the far right and increase sequentially up to the far left side of the picture. A panorama, on the other hand, has a file structure that preferably includes a header identifying the position $P_c$ at which the panorama is taken, the starting direction $D_c$ of the panorama, the vertical field of view $\theta_{fovc}$ of the capturing camera, and the perimeter $w_c$ and height $h_c$ of the panorama. Here again the image portion of the panorama file contains pixel information organized as indexed image columns. The image columns in this case are preferably indexed sequentially in a counterclockwise manner starting with the image column to the left of the starting direction. As for a concentric mosaic, its file structure preferably has a header that identifies the position $O_c$ at which the center of the capture circle is located, the radius R of the capture circle, the start direction $D_c$ of the capture process that corresponds to the central viewing direction of the first image captured to form the concentric mosaic, the lateral field of view $\Phi_{fovc}$ and vertical field of view $\theta_{fovc}$ of the capture camera, the number of pictures n the camera captured in one complete revolution around the capture circle, and the width $w_c$ and height $h_c$ of each image. In addition, the radius of the wandering circle r (the dotted circle in FIG. 3C) in which the user can move and look at any direction can be included, or it can be omitted and derived by:

$$R \tan(\Phi_{fovc}/2) \qquad (1)$$

The data section of the concentric mosaic file contains the pixel information defining the image columns of the mosaic. For a concentric mosaic, the image columns making up the image portion of the mosaic are preferably indexed from right to left in each of the images making up the mosaic beginning with the image associated with the starting direction and continuing in sequence for each subsequent image captured in the counterclockwise direction.

It is noted that as an alternative to the image file headers described above, the same descriptive information could be contained in a separate tag file that is linked to the image data file.

It is also noted that the image data may be compressed to facilitate its efficient storage and transfer over the network. This is particularly applicable to concentric mosaic data as the image files are typically as large as several hundred mega bytes. Any type of compression can be used as long as it allows for random access and quick selective decoding of the image data. One such compression technique is Vector Quantization (VQ) [12]. Any information employed that is needed to decode the data could be included in the aforementioned image file headers (or separate tag files). For example, if VQ compression is used, the headers or tag files would also include the appropriate VQ compression parameters and the VQ code book to assist the client in decompressing the incoming image data. Specifically, the header or tag file would include:

a) The block sizes $b_w$, $b_h$, $b_t$ along the width, the height and the frame of the image sequence;

b) The numbers $n_w$, $n_h$, $n_t$ of blocks along the width, the height and the frame of the image sequence;

c) The size of the code book; and d) The codebook.

2.2 The Client-Server Scheme

Figure 6A:
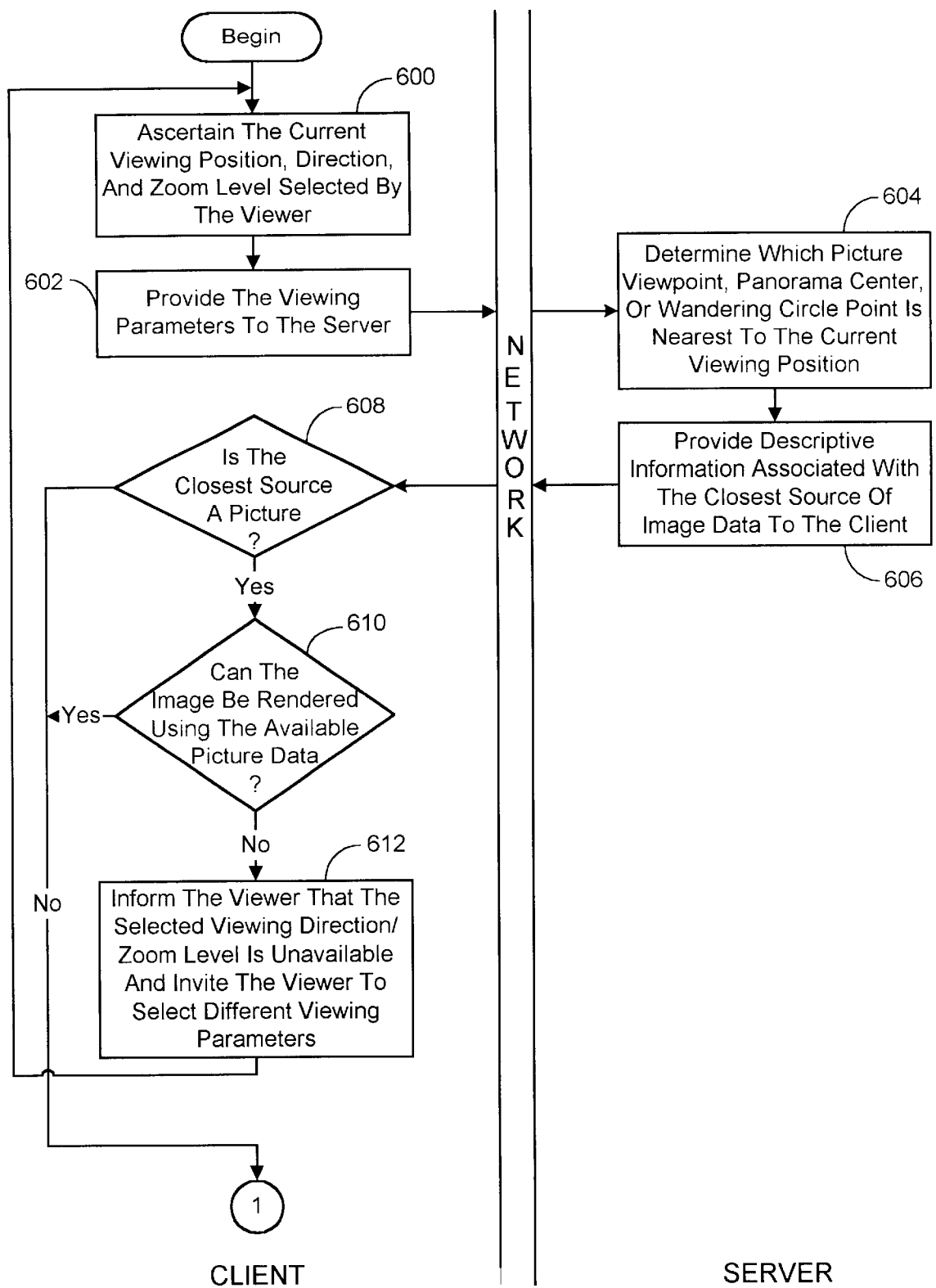
FIGS. 6A and 6B are a flow chart diagramming a process for implementing the process of FIG. 5 in a client-server based network.
Figure 6B:
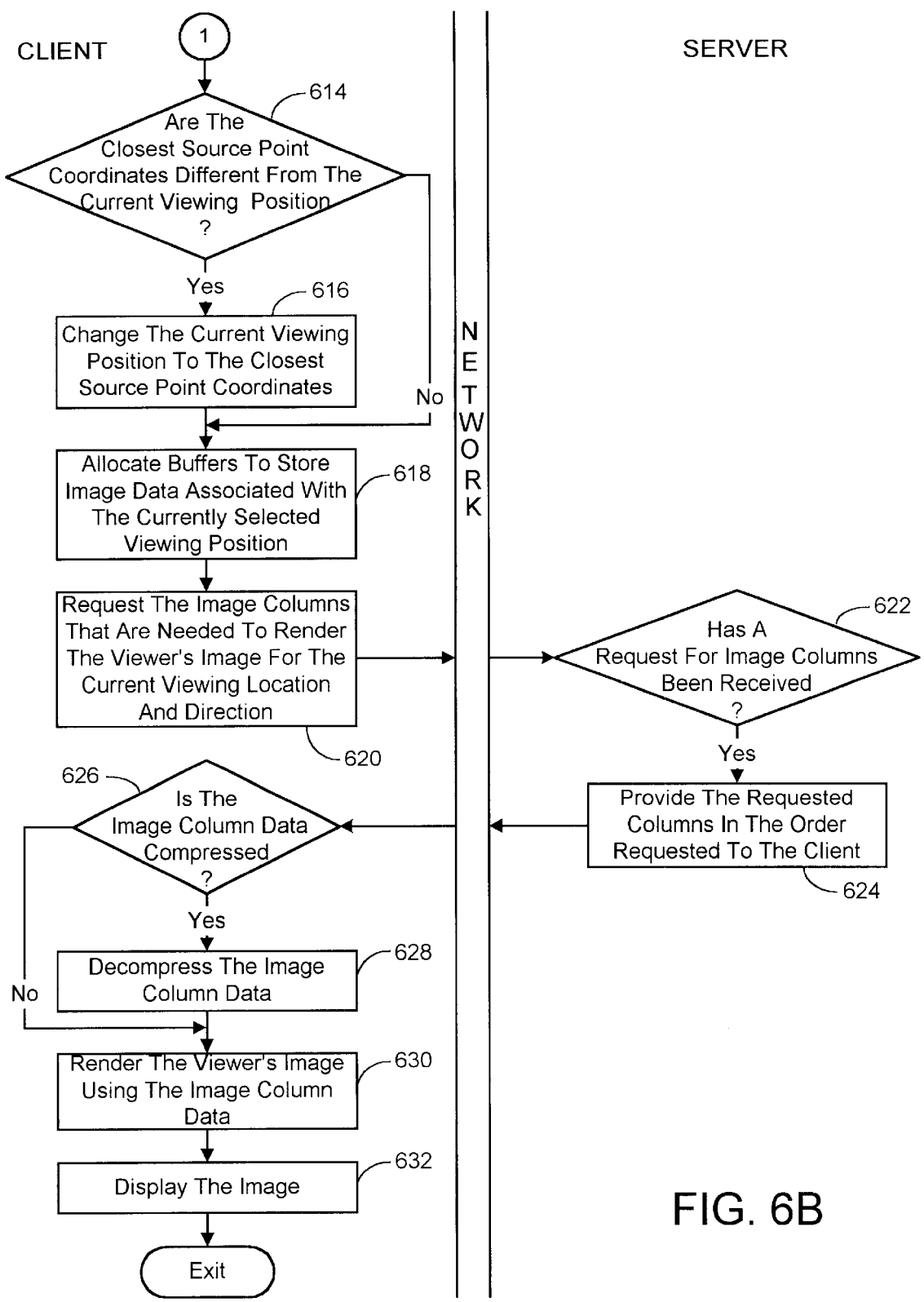

As indicated previously, the client-server scheme according to the present invention involves an interactive client-server approach where the client selectively retrieves image segments associated with the viewer's current viewpoint and viewing direction. Thus, instead of transmitting image data on a frame by frame basis (i.e., time-based transmission) as is typical with most existing transmission schemes, the present invention employs a spatial transmission technique where priority is given to the transmission of the image data needed to render a particular view of the scene. This image data may in fact come from many different, non-sequential frames of the images captured to depict the scene. In other words, rather than waiting for the particular frames of a time-sequence of frames that contain the image data needed to render the desired view of the scene to arrive, the image data needed to render the view is requested and sent. This transmission process, dubbed spatial video streaming, is accomplished as follows. Referring to FIGS. 6A and 6B, the client ascertains the current viewing position, direction, and zoom level selected by the viewer within the walkthrough space (process action 600). The client then provides these viewing parameters to the server over the network (process action 602). Upon receipt, the server determines which picture viewpoint, panorama center, and wandering circle point is nearest to the coordinates provided by the client (process action 604). It is noted that if the viewer is moving inside the wandering circle, the coordinate of the viewer is used as it was since for concentric mosaic, the view of any point within the wandering circle can be reproduced from the captured images. Thus, in such a case the "nearest" point would be deemed to be the viewpoint provided by the client. If, however, the viewer is moving outside the wandering circle and one of the points on the wandering circle is the nearest point to the viewer, the viewer is then slotted to that point on the wandering circle.

The server next sends descriptive information associated with the closest source of image data to the client over the network, including an indicator of the type of image data file (i.e., picture, panorama, or concentric mosaic), the previously-described header of the data file (or separate tag file) and the walkthrough space coordinates of the closest source point (process action 606). If the viewer's currently selected position is within the wandering circle of the same concentric mosaic as a position selected immediately preceding the current selection, then the data file type indicator and concentric mosaic header could optionally be omitted from the transmission from the server to the client as this information will be unchanged. Further, it is noted that while any viewing direction and zoom level selected by the viewer can be rendered using panoramic and concentric mosaic image data, this is not true for picture image data. Accordingly, if the closest data source is a picture, the client determines whether the image can be rendered having the selected viewing direction and zoom level using the available picture image data (process actions 608 and 610). If a image cannot be rendered from the picture image data given the selected viewing direction or zoom level, then the client would inform the viewer that the selected viewing direction or zoom level (or both) is unavailable and invite the viewer to select a different viewing direction/zoom level, or to select a different viewing position (process action 612). The process actions of 600 through 612 would be repeated as necessary until renderable viewing parameters are selected by the viewer. If it is determined in process action 608 that the nearest source of image data is not a picture, or it is determined in process action 610 that renderable viewing parameters have been selected, the client next determines whether the coordinates of the closest source point are different from the viewer's current selected location, as indicated by process action 614. If the coordinates of the closest source point are different from the viewer's current selected location, the client changes the viewer's current position to the closest source point coordinates (process action 616). As the grid cells are relatively small, this change in location will probably be imperceptible to the viewer. If, however, the coordinates of the closest source point are not different from the viewer's current selected location (as would typically be the case if the viewer is moving about inside the wandering circle of a concentric mosaic), the viewer's currently selected position remains unchanged. Next, the client allocates buffers to store the image data associated with the currently selected viewing position (process action 618), and requests the image columns that are needed to render the image corresponding to the viewing location and direction selected by the viewer (process action 620).

Figure 7:
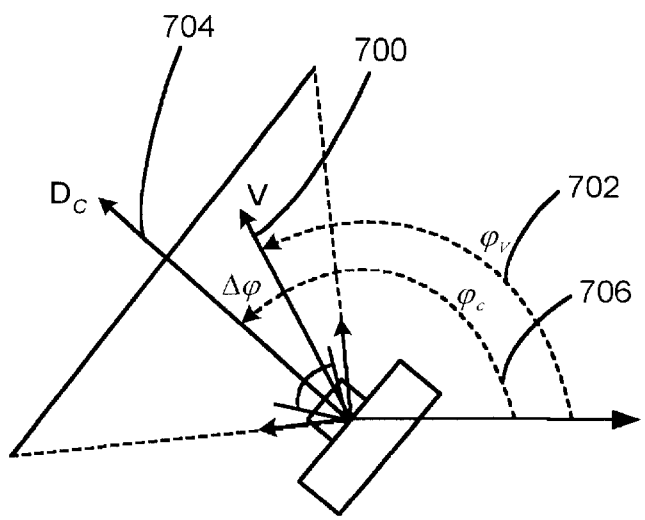
FIG. 7 is a diagram depicting the geometry associated with identifying an image column location in a picture.

The client requests the desired image columns by their index number. To this end, the task of requesting image columns would include identifying their index number. In the case where the image data is in the form of a picture, the client would determine the index numbers by computing the angle between the current viewing direction of the viewer and the aforementioned central viewing direction contained in the header of the picture's data file. Specifically, as illustrated in FIG. 7, the direction corresponding to one column of the image in the user's view is denoted as V700. Its polar angle is $\Phi_V$702. If the camera takes the picture along direction $D_c$704, the angular difference $\Delta\Phi$ of the direction V 700 and the direction $D_c$704 is equal to $\Phi_V$702 minus $\Phi_c$706, where $\Phi_c$ is the polar angle of direction $D_c$. Thus, the angular difference $\Delta\Phi$ is the aforementioned angle between the current viewing direction of the viewer and the central viewing direction. This angle $\Delta\Phi$ is used to specify the index of the image columns needed to render the image which is to be displayed to the viewer. Specifically, the index j in the picture is determined by:

$$j = \frac{w_c}{2}\left[1 - \frac{\tan(\Delta\varphi)}{\tan(\varphi_{fovc}/2)}\right] \quad (2)$$

Here we assume the pixel number of image width is even. The index can also be easily deduced if the pixel number of image width is odd. Preferably, the client also requests the image columns in order of their importance. To this end, the image columns that are needed to render the image being presented to the viewer are requested from the center of this image (which corresponds to the viewing direction) outward, in an alternating pattern. For example, the column immediately to the left of the viewing direction would be ordered first, followed by the column immediately to the right. Then, the next column to the left would be requested, and then the next one to the left, and so on.

Figure 8:
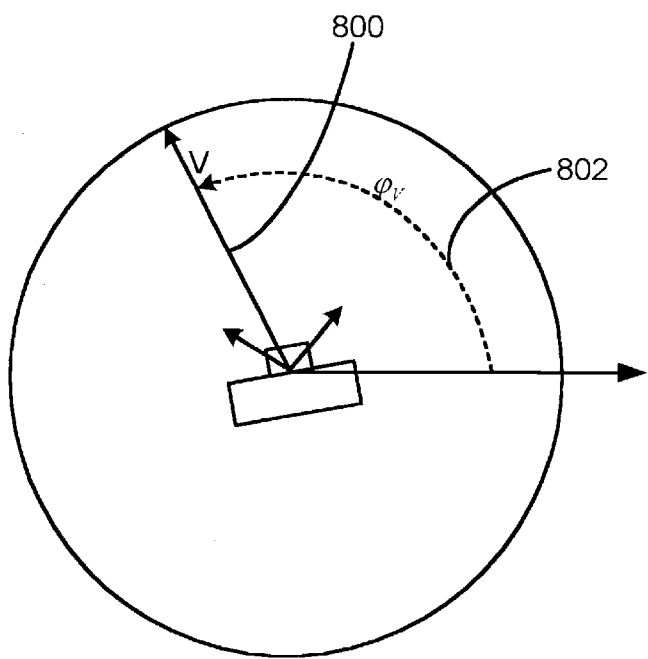
FIG. 8 is a diagram depicting the geometry associated with identifying an image column location in a panorama.

If the image data is in the form of a panorama, the client requests the needed image columns in much the same way as picture data. Namely, the client computes the angle between the current viewing direction of the viewer and the aforementioned starting direction contained in the header of the panorama's file. Specifically, referring to FIG. 8, if the direction corresponding to one column of the image in the user's view is V800, the column in the panorama is determined by the polar angle $\Phi_V$802 of the direction V. The client uses the computed angle to specify the index of the required image columns, according to the indexing scheme described earlier for a panorama. As with the picture data, the image columns are requested in an alternating pattern from the center of the image being presented to the viewer.

Figure 9:
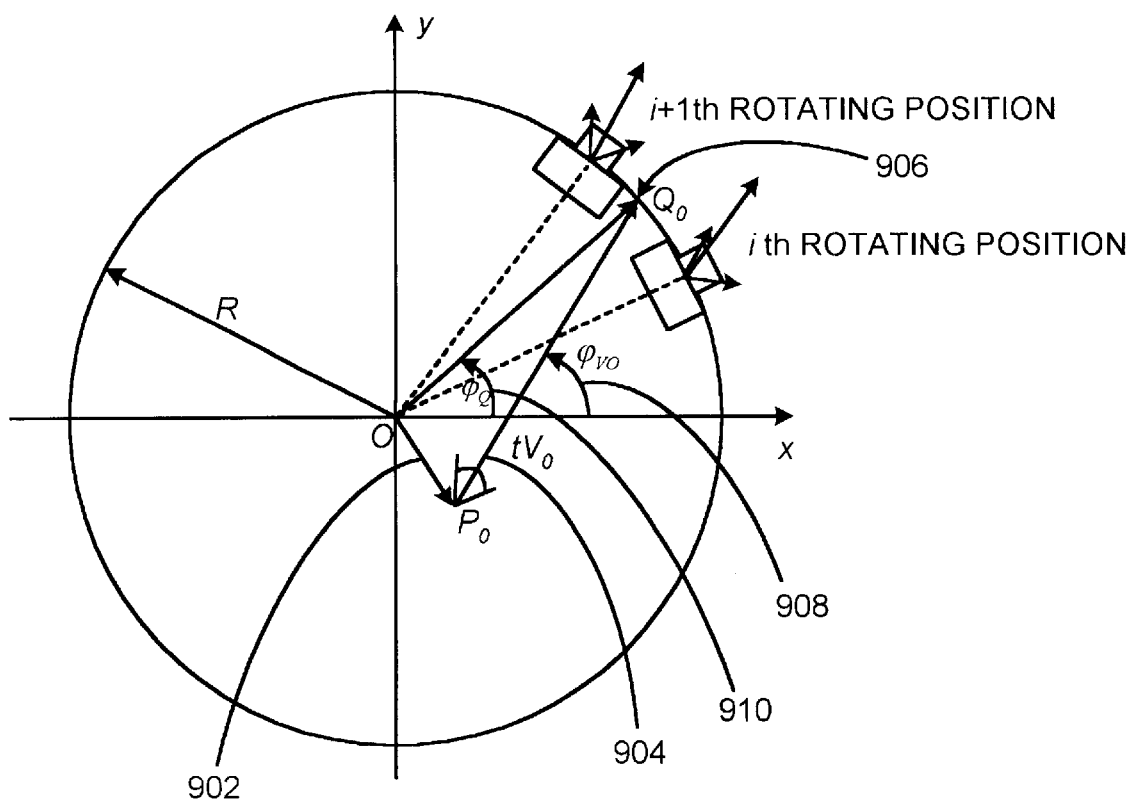
FIG. 9 is a diagram depicting the geometry associated with identifying an image column location in a concentric mosaic.

As for image data in the form of a concentric mosaic, the client requests the image columns needed to construct the viewer's image by first computing the azimuth angle between the current viewing direction of the viewer and the central viewing direction of an image captured at the intersection of the viewing direction with the capture circle of the concentric mosaic. The information provided in the previously transmitted header or tag file will allow the client to determine the intersection point and compute the azimuth angle. Specifically, as illustrated in FIG. 9, the viewer is located at point P. One of the viewing rays from the viewer is denoted as V900. $P_0$ 902 and $V_0$904 are the projection vectors of P and V on the capture plane respectively. The intersection point $Q_0$906 of the viewing ray $V_0$904 and the capture circle is obtained by $$Q_0 = P_0 + tV_0 \quad (3)$$

where t is the positive root of the equation $$\|P_0 + tV_0\|^2 = R^2 \quad (4)$$

The direction from the circle center to the intersection point $Q_0$906 may either coincide with one of the rotating positions of the camera array (i.e., the positions on the capture circle where images of the scene were captured) or lie between two adjacent rotating positions. According to geometric relations, the azimuth angle $\Delta\Phi$ between $V_0$ and the direction of camera at the above rotating position is equal to the azimuth angle $\Phi_{V0}$ 908 of $V_0$ 904 minus the azimuth angle $\Phi_Q$ 910 of the rotating position $Q_0$906. The angle $\Delta\Phi$ may correspond to either one or two adjacent columns of the images captured by the camera array at the rotating position. The computed angle is then used as a basis to specify the index of the required image columns in accordance with the indexing scheme described earlier for concentric mosaics. As before, the image columns are requested in an alternating pattern from the center of the image being presented to the viewer.

In conjunction with the foregoing image column identification procedure, if $Q_0$ lies between two adjacent rotating positions, the image columns used to render the image presented to the viewer are formed by combining or interpolating the correspondingly located image columns of the adjacent camera rotating positions. This interpolation is accomplished in accordance with the procedures described in reference [11] using interpolation weights that are inversely proportional to the angular differences between the direction from the circle center and the two rotating positions. Likewise, if $\Delta\Phi$ lies between two adjacent columns of the images, the image columns used to render the image presented to the viewer are formed by combining the adjacent columns (which may themselves be combinations of the columns of two adjacent camera rotation positions as described above). This latter interpolation is also accomplished in accordance with the procedures described in reference [11] using interpolation weights that are inversely proportional to the angular differences between $\Delta\Phi$ and those of the two adjacent columns of the images. There are two options for performing interpolation when the intersection point $Q_0$ lies between two rotating positions of the camera array or when the angle $\Delta\Phi$ corresponds to two adjacent columns of the images captured by the camera array, or both. Under a first scenario, the client would identify to the server which image columns (via their index numbers) need to be interpolated. The server would then combine the identified columns and proving a single interpolated column to the client in response to the request. The second scenario involves the client requesting all the image columns needed for the interpolation from the server. The server would then transmit all the requested column and the client would combine them. Either scenario can be implemented, although it is noted that the second scenario would require the transmission of more image data. However, as will be discussed shortly, some embodiments of the present invention entail sending image column data for storage by the client in anticipation of it being requested. In those cases the second scenario would be implemented as the server will not know which image columns need to be combined ahead of time.

Referring again to FIG. 6B, whenever the server receives a request for image columns from the client, it sends the client the requested columns (which may be interpolated columns as described above) in the order requested (process actions 622 and 624). The transmitted image column data can be in compressed or uncompressed form. If the image column data is compressed, as it preferably would be for transfer over a network, the client decompress the data upon its receipt (process action 626 and 628). When VQ compression techniques are employed to compress the data, the VQ compression parameters and the VQ code book would be retrieved from the image file header (or tag file as the case may be) to accomplish the decompression task. The client uses the image column data to render the viewer's image (process action 630), and display it to the viewer (process action 632). The client would monitor the viewer's actions to determine if the viewer changes any of the previously-selected viewing parameter (i.e., viewing position, direction, and zoom level). When the viewer changes one of more of the viewing parameters, the foregoing process (actions 600 through 632) is repeated.

2.3 Requesting Additional Image Data

In the foregoing description the client requested those image columns that were needed to render an image based on the viewing parameters selected by the viewer and stored them in the allocated buffer space. While, the client could simply stop requesting image columns once all those necessary to render the image have been solicited, this need not be the case. It will often be the case that all the image columns needed to render the desired view will be requested before the viewer changes the viewing parameters. In general, it would be possible to use time after the required requests are complete to request additional image data in anticipation of the viewer's next move. The extra image data would be stored in the client's memory and used as needed in rendering an image associated with future viewer-selected viewing parameters, rather than requesting them from the server at that time. This would speed up the rendering process because some of the image data needed to render an image could simply be retrieved from the client's memory. In addition, network bandwidth would be freed up to request and receive other image data. The proposed "continuing request" procedure can be implemented use a full cache or partial cache strategy.

2.3.1 The Full Cache Strategy

The full cache strategy involves streaming the image data associated with the whole scene to the client and storing it in memory. This strategy is particularly applicable when the amount of image data needed to render the entire scene is small enough to be readily stored by the client. In operation, the full cache strategy requires that any requested data be provided first in the manner described previously, with the remainder being sent as time permits. In this way, eventually the whole scene will be stored by the client. If this option is implemented, the client would check the stored data before requesting an image column to ensure it has not already been sent. If the required column is already in storage, it is simply retrieved. If the required column is not found in the client's memory, then a request is made to the server as described previously.

2.3.2 The Partial Cache Strategy

The partial cache scheme is preferred when either the client's storage capability is very small such as in mobile devices, or when the amount of the image data is so large (e.g., concentric mosaics) that transmitting and storing all of it is impractical. In the partial cache option, two initially equal-sized buffers are allocated in the client's memory. The initial size of these buffers is made large enough to store the data associated with the number of image columns needed to render a full 360 degree view of the scene (i.e., a panorama) around the viewer's current position in the walkthrough space and at the viewer's current zoom level (i.e., the current lateral field of view). The perimeter of the panorama is chosen to be $360 \times w_u/\Phi_{fov u}$, and the height is chosen to be $h_u$, where $w_u$ and $h_u$ are the width and height of the image in the viewer's image and $\Phi_{fov u}$ is the field of view of the viewer. The reason for sizing the buffers in this manner is that the client continues to request image columns in the aforementioned alternating fashion even when all the columns necessary to render the current image of the scene to the viewer have been requested. Thus, in the case of panorama or concentric mosaic image data, enough image columns to render a full panoramic view of the scene surrounding the viewer's current position could eventually be transferred. This data would be entirely stored in one of the two buffers, which will be referred to as the active buffer. In the case of picture image data, the same continuing request procedure is implemented until all the image columns in the picture have been requested. However, in such a case, the viewer's ability to rotate would be limited as discussed previously, and the allocated buffer space would not be filled.

2.3.2.1 Rotating The Viewing Direction

The continuing request procedure has the advantage of providing, ahead of time, the image data that the client would need to render images of the entire scene surrounding the viewer's current location. Thus, a viewer could rotate their viewing direction about the same viewpoint in the walkabout space and be presented images of the surrounding scene on nearly a real-time basis. This is significant because changing viewing direction provides an impressive experience for the user even when the bandwidth is limited. However, it is possible that a viewer will attempt to rotate the viewing direction into a region of the scene associated with image columns that have not yet been received by the client. To minimize the occurrence of such an event, the requesting process is preferably modified any time the viewer rotates their viewing direction. Specifically, rather than employing the aforementioned alternating request procedure, the client immediately begins requesting successive image columns in the direction the viewer is rotating, and stops requesting columns in the direction opposite the viewer's rotation. In this way all the requesting efforts are shifted to obtaining the image column needed to render the potential desired view and so the order of importance for requesting image column becomes those consecutive columns not already requested in the direction of rotation. Should the viewer change the direction of rotation, this same-direction requesting procedure would be repeated, except in the opposite rotation direction, beginning with the image column adjacent the last-requested column in that direction. It will be recalled that the outermost boundary was preferably tracked and so the location of this last-requested column would be known. The same-direction requesting procedure continues until all the available image columns are exhausted (such as when the image data is in the form of a picture), or when all the image columns needed to provide a 360 degree view of the scene have been requested. It is noted that the ultimate goal of either the alternating or the same-direction requesting procedures is to provide the image data needed to render an image of the scene in the viewer's current viewing direction as fast as possible.

2.3.2.2 Changing Viewing Position or Zoom Level

Figure 10:
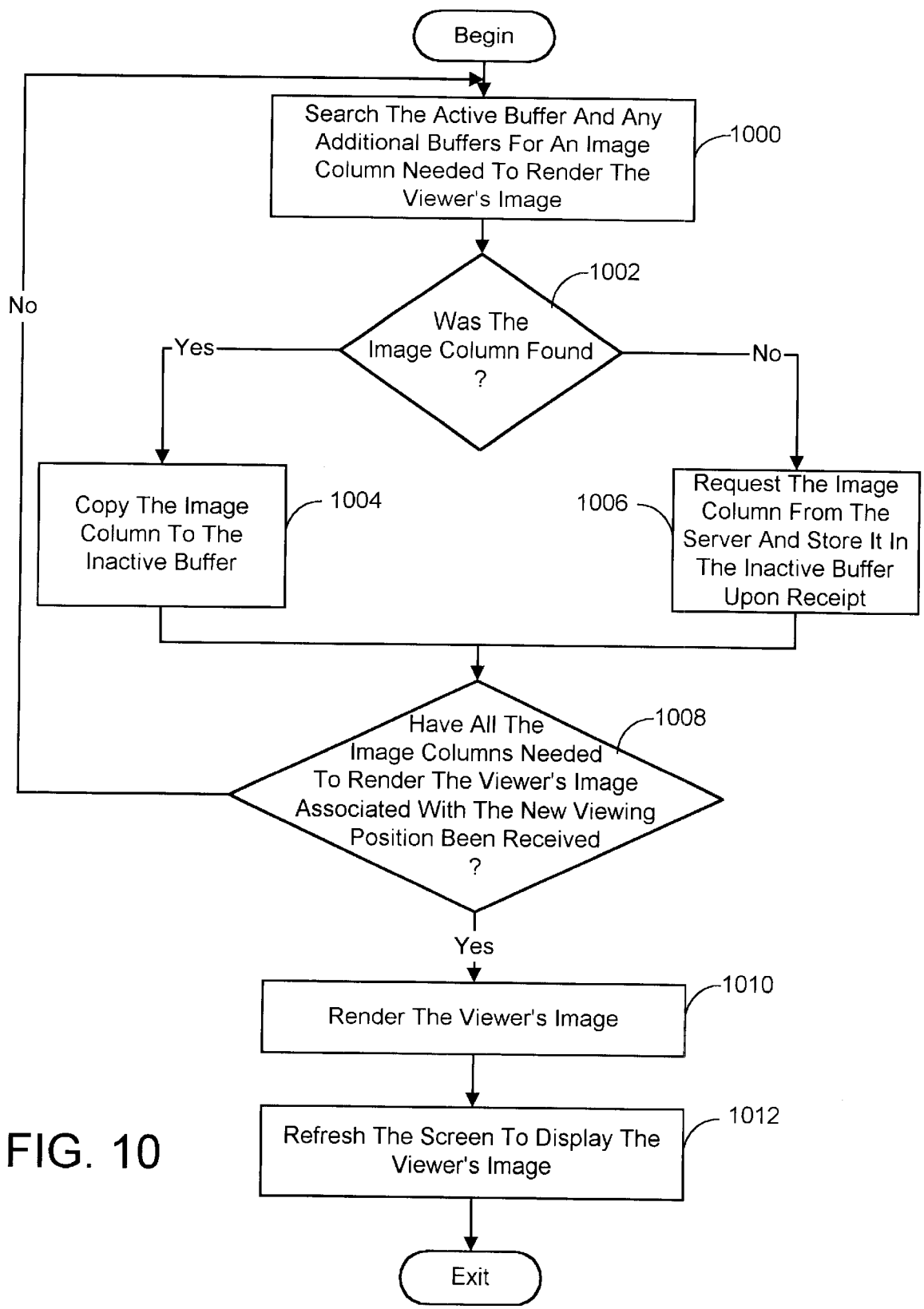
FIG. 10 is a flow chart diagramming a process for building up an inactive primary buffer to provide an image of the scene to a viewer from a newly selected viewing location or at the same location but at a different zoom level in an embodiment of the invention employing a partial cache strategy.

During the process of building up the active buffer or once it is full, the viewer may change positions (i.e., translate within the walkthrough space), or zoom in to or out from a current view of the scene. In the case of the viewer changing viewpoints, the current requesting procedure is terminated, and the client-server interaction described above is started over for the new location, with the exception that the second buffer comes into play. Specifically, referring to FIG. 10, rather than requesting the server to provide every image column needed to produce the new view of the scene to the viewer, it is recognized that some of the image columns may have already been requested and received in connection with building-up the buffers associated with the previous viewpoint or zoom level, at least in the case of concentric mosaic image data. Additionally, as will be discussed later, additional buffers may have been created and filled with image data. Accordingly, before requesting an image column from the server, the client searches the active buffer and any additional buffers (process action 1000) to determine if the image column has already been received (process action 1002). If so, it is copied to the inactive buffer, as indicated by process action 1004, which becomes the new active buffer. If not, it is requested from the server and stored in the new active buffer upon receipt, as indicated by process action 1006.

It is next determined if all the image columns needed to render the viewer's image associated with the new viewing position have been received from the server (process action 1008). If not process action 1000 through 1008 are repeated for each of the remaining required image columns. As soon as the image columns still needed to render the image of the scene for the new viewpoint have been received the viewer's image is rendered (process action 1010). Finally, the screen is refreshed to display the image associated with the new position to the viewer (process action 1012). The coordination between the two primary buffers is then repeated every time the viewer moves to a new viewpoint in the walkthrough space, except the buffers exchange roles each time. Any leftover image data remaining in the newly designated active primary buffer would be discarded or overwritten.

In the case of where the viewer zooms into or out of the currently depicted portion of the scene, the two-buffer scheme also comes into play. Specifically, the second buffer is used to gather the image columns needed to present the zoomed image to the viewer. However, it is noted that when the viewer's lateral field of view decreases as when the viewer zooms in, the result is the need for more image columns to provide the same-dimensioned image to the viewer. Thus, in the case where the image data is associated with a panorama or concentric mosaic, the size of the "receiving" buffer must be increased to accommodate the additional image data that will ultimately be stored to allow rendering of the entire panoramic view of the scene from the selected viewing position at the new zoom level. It should be noted that the changing of the lateral field of view $\Phi_{fovu}$ of the user is preferably constrained so that the column number of the new panorama will be an integer:

$$|\Delta(360w_u/\Phi_{fovu})|=1 \quad (5)$$

i.e., where $$|\Delta\Phi_{fovu}|=\Phi_{fovu}^2/360w_u \quad (6)$$

For typical values such as $\Phi_{fovu}=45°$ and $w_u=360$, $|\Delta\Phi_{fovu}|=0.02°$. This condition is reasonable since $|\Delta\Phi_{fov}|$ is small enough. Once the buffer size has been increased, the process of copying and requesting the needed image column is the same as described previously.

2.3.2.3 Additional (Secondary) Buffers

Another aspect of the image column requesting process involves building up additional or secondary buffers of image data in an attempt to anticipate the next change in the viewer's viewpoint within the walkthrough space. The number of additional buffers is related to the size of the client's memory. Thus, assuming the client has sufficient available storage space, additional buffers could be created and filled whenever the client and server are not busy providing image data to fill the active primary buffer. Each of the new buffers would contain the image columns needed to render images of the surrounding scene from a different viewpoint. Preferably, buffers associated with the image data corresponding to viewpoints immediately adjacent the current viewpoint (based on the current step size) would be filled first, with subsequent buffers being filled with image data associated with viewpoints radiating progressively out from the current viewpoint. For example, the image data corresponding to the viewpoint nearest the current viewpoint could be chosen first, then the second closest, and so on. It is noted that the new viewpoints could be associated with image data in the form of a picture, panorama or concentric mosaic. The new buffers can be filled if desired in the same alternating pattern as at least initially used to fill the active primary buffer, with the exception the viewing direction would be assumed to be the central viewing direction of a picture, the starting direction of a panorama, or the central viewing direction of the first image captured to form the concentric mosaic, as the case may be. It is noted that in the case where the next viewpoint for which an additional image data buffer is to be created is within the same concentric mosaic wandering circle as the viewpoint or viewpoints associated with previously filled additional buffers, there may be some number of image columns needed to build up the new buffer that were already requested and stored in the aforementioned previously filled buffers. As such, the client would search the previously filled buffers associated with the concentric mosaic for any needed image column, before requesting its transmission from the server. If it is discovered that a needed image column has already been stored in another buffer, it could be copied to the buffer being built. Under some circumstances, however, an image column stored in a primary buffer may need to be discarded or overwritten. For example, if the image column in question is stored in the non-active of the two primary buffers and the viewer changes zoom level, the client would convert this buffer to the active buffer to as described previously. Accordingly, an image column found in one of the primary buffers would be marked for retention and if the primary buffer needs to be re-used, the marked columns would be copied to the appropriate additional buffer before being discarded or overwritten.

As with the two-buffer scheme, the viewer may change viewpoints during the process of building up the additional buffers. In that case, the current requesting procedure is terminated, and the requesting process to fill the active primary buffer and any additional buffers is begun again for the new viewpoint. However, if the new viewpoint is within the wandering circle of the same concentric mosaic, some of the image columns in the previously filled buffers may be needed to fill the new buffers. Accordingly, the client would preferably search the existing buffers for the needed image columns before requesting them from the server. These image columns could be copied to the new buffer. Once the previous buffers have been searched for all image columns needed to fill the new primary buffer and optionally new additional buffers, the unused image column data is discarded to free up memory space in the client.

Figure 11A:
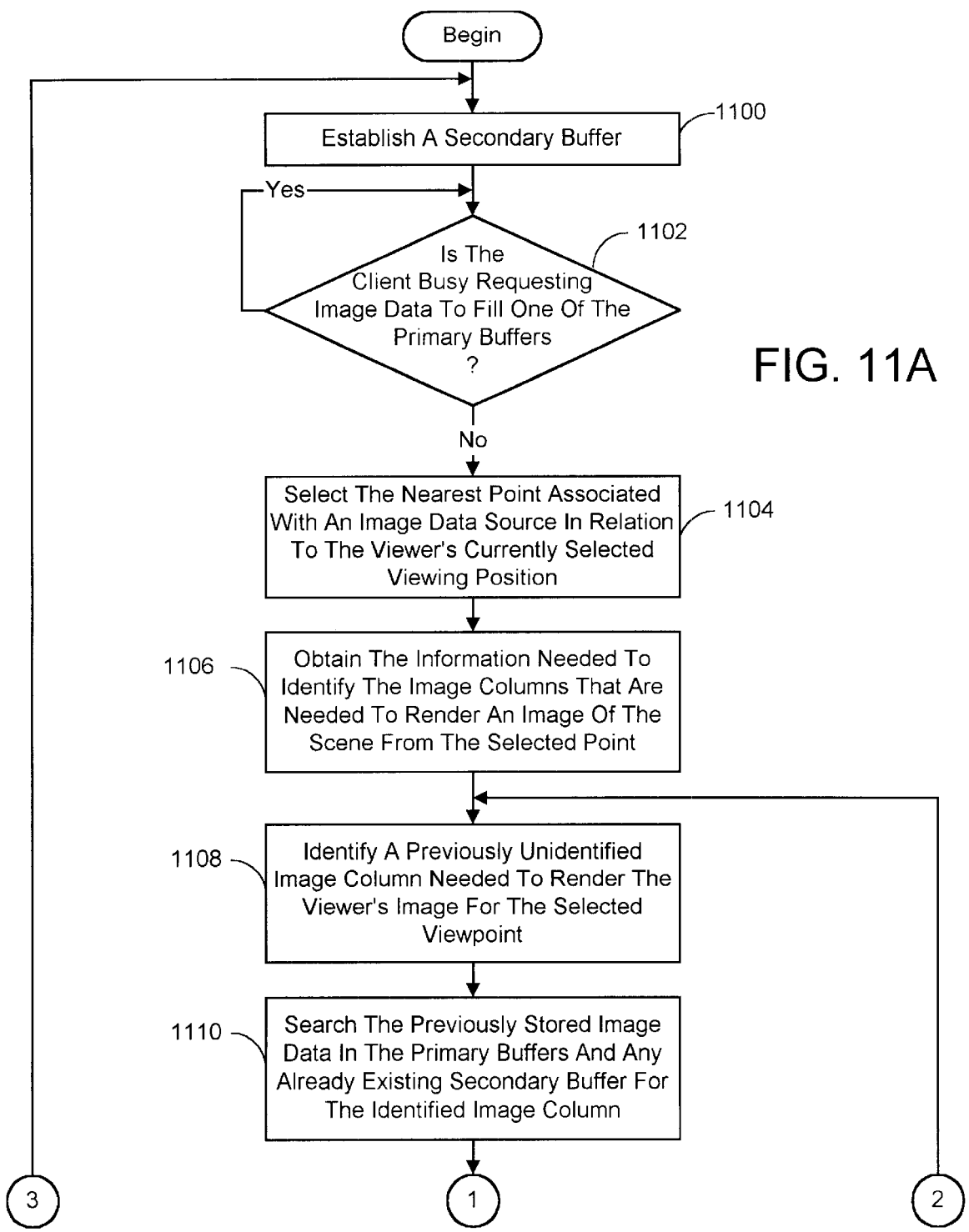
FIGS. 11A and 11B are a flow chart diagramming a process for building up a secondary buffer with image data for providing an image of the scene to a viewer from a yet unselected viewing position in anticipation that the viewer might select that position.
Figure 11B:
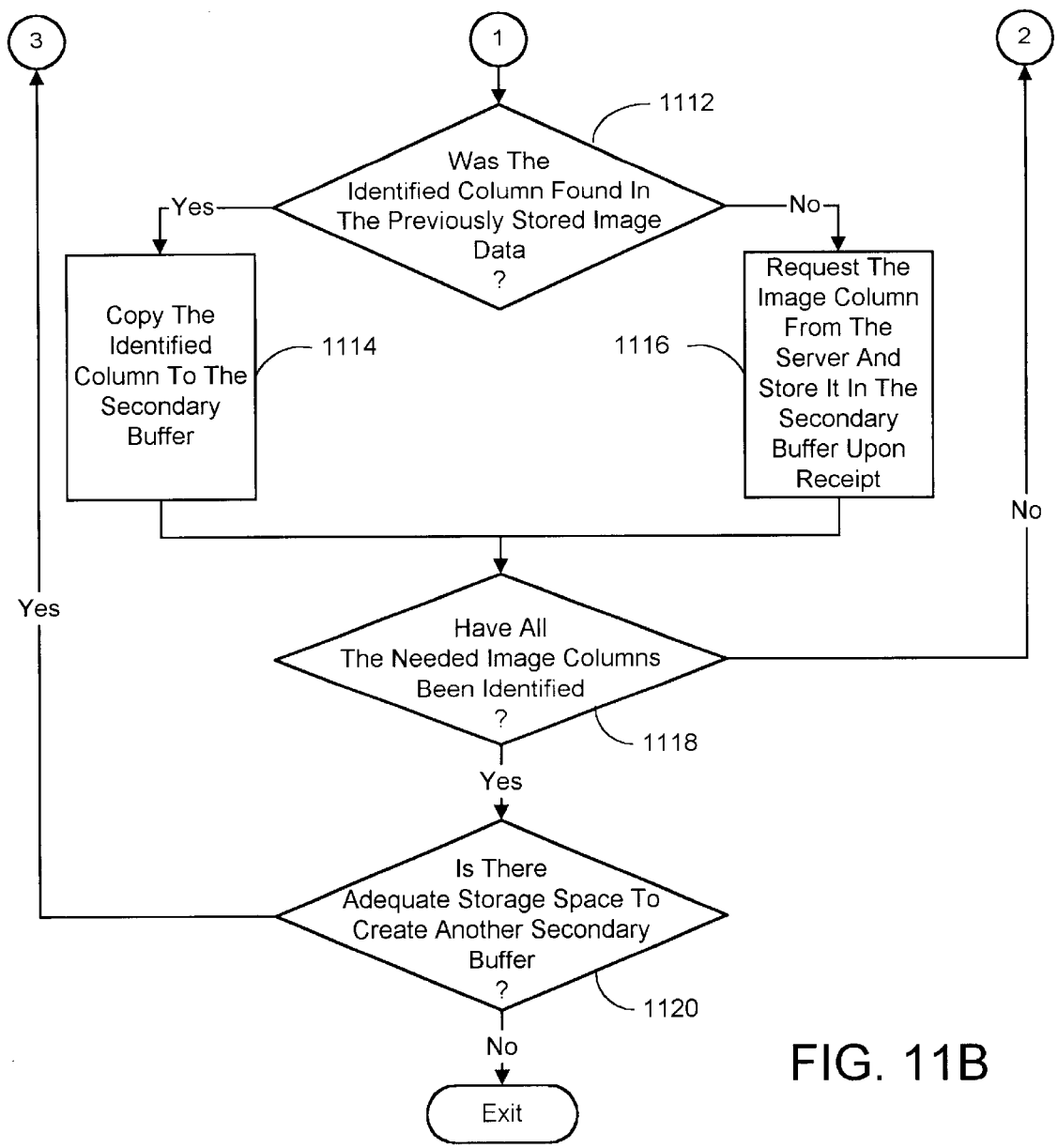

Referring to FIGS. 11A and 11B, the foregoing embodiment involving the creating of additional or secondary buffers can be implemented as follows. First, a secondary buffer is established (process action 1100). It is then determined whether the client is busy requesting image data to fill one of the primary buffers, as indicated by process action 1102. If so, no action is taken until there is a pause in the requesting process. When the client is free, the next process action 1104 involves selecting the nearest point associated with an image data source in relation to the viewer's currently selected viewing position. The client then obtains the information needed to identify the image columns from the data source that are needed to render an image of the scene from the selected point (process action 1106). This may be enough data to construct a panorama of the scene from the point if the image data source is a panorama or concentric mosaic. In the case where the image data source is a picture, the information is used to identify all the available image column. The foregoing two actions (i.e., 1104 and 1106) can be accomplished by the client requesting the server identify the closest point and provide information concerning the image data source associated with that point, and the server responding by providing the previously described descriptive information from the header or tag file associated with the closest image source point. However, if the current viewing position is within the wandering circle of a concentric mosaic, the client will already have the necessary information as it would have been provided previously. Thus, the client could simply select a point in the wandering circle that is one step length away (e.g., by assuming the last selected step length or a default step length) from the current position and retrieving the needed descriptive information from memory. The direction of the step can be selected arbitrarily or in the same direction as the last step. Once the nearest point is selected and the descriptive information is available, the client identifies an image column that is needed to render a viewer's image for the selected viewpoint (process action 1108). A search is then made of the previously stored image data in the primary buffers or any already existing secondary buffer for the identified image column (process action 1110). If it is determined via process action 1112 that the identified column exists in the previously stored image data, it is copied to the newly created secondary buffer (process action 1114).

If the identified image column is not found in the search, it is requested from the server and stored in the newly created secondary buffer upon receipt (process action 1116). It is next determined if all the available image columns in the case of picture image data, or all the image column needed to render a 360 degree view of the scene from the selected viewpoint in the case of panorama or concentric mosaic image data, have been identified, as indicated by process action 1118. If not, the process of actions 1108 through 1118 is repeated for each previously unidentified image columns. If all the needed image columns have been previously identified and processed, then it is next determined if the client has adequate storage space to create another secondary buffer associated with another viewpoint, as indicated by process action 1120. If so, the foregoing process (i.e., process actions 1100 through 1120) is repeated to create and fill another secondary buffer for the next closest image data source point in relation to the currently selected viewing position. If not, the process is terminated.

2.4 Lost Image Data

It is noted that during the transmission of image data from the server to the client, there is a possibility that a requested image column may be lost due to transmission errors inherent in a network environment, and especially if the Internet is involved. This problem is preferably handled on the client side in the present system and process. Specifically, if a requested image column is not received, the client fills in the missing column using adjacent received columns. This can entail repeating an adjacent column, or blending the columns adjacent the missing column via conventional methods to create a substitute column.

3.0 Experimental Results

We have implemented our image-based walkthrough system in a local area network and a modem dial-up network. In our system, the server is supported by Microsoft Corporation's Windows 2000 Server on the platform of Dell Computer's PowerEdge™ 2300 with 1GB RAM and 2 of Intel Corporation's Pentium® III processors at 500 MHz. The client is running Microsoft Corporation's Windows 2000® Professional operating system on the platform of Dell Computer's OptiPlex™ Gx1p with 256 MB RAM and one of Intel's Pentium® II processor at 450 MHz. We use concentric mosaics files as our image data files in each demo since their sizes are much larger than those of the pictures and panoramas and therefore are more representative. The uncompressed file size of the concentric mosaics file is 864MB since we captured 2913 images in one revolution. Vector quantization was employed to compress the data. We adopted a 2×2×2 block size and 16K as the number of codewords. This resulted in a codebook size of 512KB and a compression ratio of 12:1. The compressed concentric mosaics files are all wholly loaded into the server's memory and the indexes of image columns are dynamically extracted on request of the client. We also adopted the partial cache strategy at the client end since the full cache strategy is relatively easy and can always reach a high frame rate after sufficient downloading time.

Theoretically, a frame of the user's view with resolution of 360×288 pixels contains 360×144=51,840 indexes of the codebook since each column usually comes from different frames in the concentric mosaic. This occupies 103,680 bytes if we use a code size of 16 bits. In the 10 Mbps local area network, the maximum frame rate should be 11 fps if the correlation of the image columns used in sequential frames of user's view is not considered and other computational cost is also not counted. Similarly in the 56 Kbps dial-up network, the maximum frame rate should be 0.5 fps.

In one tested embodiment, the view of the user changed smoothly while the user rotated. The user can also move left and right, forward and backward to experience horizontal parallax. It should be noted that when the user zooms in, the view remains very clear rather than becoming blurry as in the usual case since we create a larger buffer in each zooming step according to the new field of view and retrieve new image columns from the server.

In another tested embodiment, navigation of the scene in a low bandwidth condition is attempted. Before the view is displayed, it costs about 2 minutes to transmit the codebook (512KB) of vector quantization of the concentric mosaic. We can see that the view extends from the center to the two sides and it further extends along the direction we rotate. The actual frame rates in the two tested embodiments are all over 15 fps for rotation after sufficient downloading time (1 second and 33 seconds, respectively). For translation and zooming, our system reaches 3 fps in the first tested embodiment, which is lower than the theoretical value due to additional computational cost, and 1 fps in the second tested embodiment, which is higher than the theoretical value due to the reuse of the image columns in the buffers.

It is worth mentioning that for a frame with resolution of 180×144 pixels, a corresponding panorama contains 103680 indexes of the codebook. It occupies 207360 bytes if each index uses 16 bits. With the use of partial caches, the total amount of memory is equal to the codebook size (512KB) plus two panorama sized buffers (405KB), i.e., no more than 1MB including the program itself. It is interesting that our partial cache scheme is suitable for devices with small memory such as hand-held, palm-size PCs or mobile phones. This is true even though scenes captured using large data sources such as a concentric mosaic were employed.

While the invention has been described in detail by specific reference to preferred embodiments thereof, it is understood that variations and modifications thereof may be made without departing from the true spirit and scope of the invention.

4.0 REFERENCES

[1] R. Carey, G. Bell, and C. Marrin, The Virtual Reality Modeling Language. Apr. 1997, ISO/IEC DIS 14772-1.
[2] M. Deering, Geometry Compression, Computer Graphics Proceedings, Annual Conference Series, pages 13–20, Proc. SIGGRAPH 1995, August 1995.
[3] J. K. Li and C. -C. J. Kuo, Progressive Coding of 3D Graphics Models, Proceedings of IEEE, Vol. 86, No. 6, Pages 1052–1063, June 1998.
[4] S. N. Matsuba and B. Roehl, Bottom, Thou Art Translated: The Making of VRML Dream, IEEE Computer Graphics and Applications, Vol. 19, No. 2, Pages 45–51, March/April, 1999.
[5] G. Taubin, W. P. Horn, F. Lazarus, and J. Rossignac, Geometry Coding and VRML, Proceedings of IEEE, Vol. 86, No. 6, pp.1228–1243, June 1998.
[6] S. E. Chen and L. Williams, View Interpolation for Image Synthesis, Computer Graphics Proceedings, Annual Conference Series, pages 279–288, Proc. SIGGRAPH 1993 (California), August 1993.
[7] S. E. Chen, QuickTime VR-An Image-based Approach to Virtual Environment Navigation, Computer Graphics Proceedings, Annual Conference Series, pages 29–38, Proc. SIGGRAPH 1995 (Los Angeles), August 1995.
[8] A. Lippman, Movie Maps: An Application of the Optical Videodisc to Computer Graphics, Computer Graphics (Proc. SIGGRAPH 1980), pp. 32–43, 1980.
[9] D. G. Riply, DVI—A Digital Multimedia Technology, Communications of the ACM, 32(7): 811–822, 1989.
[10] G. Miller, E. Hoffert, S. E. Chen, E. Patterson, D. Blackketter, S. Rubin, S. A. Applin, D. Yim, J. Hanan, The Virtual Museum: Interactive 3D Navigation of A Multimedia Database, The Journal of Visualization and Computer Animation (3): 183–197, 1992.
[11] H. Y. Shum and L. W. He, Rendering with Concentric Mosaics, Computer Graphics Proceedings, Annual Conference Series, pages 299–306, Proc. SIGGRAPH 1999 (Los Angeles), August 1999.
[12] A. Gersho, R. M. Gray, Vector Quantization and signal compression, Kluwer Academic Publishers, 1992.

Wherefore, what is claimed is:

1. A computer-implemented walkthrough process for providing images of a surrounding scene to a viewer, said process comprising using a computer to perform the following process actions:

defining a virtual walkthrough space in which the viewer can select a viewing position on a viewing plane therein for viewing the scene;

dividing the viewing plane of the walkthrough space into a sectioned grid comprising a plurality of cells;

assigning to each cell of the grid at least one source of image data from which an image of a part or all of the surrounding scene as viewed from that cell can be rendered, wherein each of said image data sources assigned to a cell is associated with at least one point within the cell; and whenever the viewer selects a viewing position, providing an image to the viewer depicting at least a part of the scene as would be viewed from the cell containing the selected viewing position, wherein providing said image to the viewer comprises, determining in which cell the selected position resides, ascertaining which of the points associated with data sources assigned to the cell containing the selected position and any directly adjoining cell is closest to the selected position, and displaying to the viewer an image depicting a portion of the surrounding scene from the perspective of the point ascertained to be the closest to the selected position, said image being rendered from image data taken from the source associated with the ascertained closest point.

2. The process of claim 1, wherein the process action of defining the walkthrough space comprises the action of defining a space having virtual dimensions consistent with the available image data.

3. The process of claim 1, wherein the image data sources comprise a picture representing a part of the surrounding scene as would be viewed from a capture point of the picture.

4. The process of claim 3, wherein the process action of associating each image data source with at least one point within a cell, comprises the action of associating said picture with the capture point of the picture.

5. The process of claim 1, wherein the image data sources comprise a panorama representing the surrounding scene as would be viewed from a capture point of the panorama.

6. The process of claim 5, wherein the process action of associating each image data source with at least one point within a cell, comprises the action of associating said panorama with the capture point of the panorama.

7. The process of claim 1, wherein the image data sources comprise a concentric mosaic comprising image data from which an image of the surrounding scene can be rendered as would be viewed from any point within a wandering circle of the concentric mosaic.

8. The process of claim 7, wherein the process action of associating each image data source with at least one point within a cell, comprises the action of associating said concentric mosaic with each point within the cell that is contained within the wandering circle of the concentric mosaic.

9. The process of claim 1, wherein the viewer can additionally select a viewing direction for viewing the scene from the selected viewing position, and wherein the process action of providing an image to the viewer, comprises an action of providing an image of a part of the scene centered laterally in the selected viewing direction.

10. The process of claim 1, wherein the process action of defining a virtual walkthrough space in which the viewer can select a viewing position on a viewing plane therein for viewing the scene, comprises an action of limiting each consecutive selection of a viewing position to a prescribed step length resulting in an image being provided to the viewer in conjunction with each newly selected viewpoint that appears to the viewer as a smooth transition from the last previously-selected viewing position.

11. The process of claim 1, wherein the process action of defining a virtual walkthrough space in which the viewer can select a viewing position on a viewing plane therein for viewing the scene, comprises an action of limiting each consecutive selection of a viewing position to a minimum step length exceeding the longest dimension of the grid cells.

12. The process of claim 11, wherein the process action of dividing the viewing plane of the walkthrough space into a sectioned grid comprising a plurality of cells, comprises an action of making each cell small enough that the minimum step length results in an image provided to the viewer in conjunction with each newly selected viewpoint that appears to the viewer as a smooth transition from the last previously-selected viewing position.

13. The process of claim 1, wherein the image data sources comprise pictures each representing a part of the surrounding scene as would be viewed from a capture point of the picture, panoramas each representing the surrounding scene as would be viewed from a capture point of the panorama, and concentric mosaics comprising image data from which an image of the surrounding scene can be rendered as would be viewed from any point within a wandering circle of the concentric mosaic, and wherein the process action of associating each image data source with at least one point within a cell, comprises the action of associating each picture with the capture point of the picture, associating each panorama with the capture point of the panorama, and associating each concentric mosaic with each point within the cell that is contained within the wandering circle of the concentric mosaic.

14. The process of claim 13, further comprising a process action of whenever it is ascertained that the point closest to a currently selected viewing position is outside the wandering circle of any concentric mosaic and associated with the same image data source used to render the last previously-displayed image of the scene, the viewer is warned to select a viewing position that is far enough away from the point associated with the image source used to render the last previously-displayed image of the scene such that a point associated with another image source represents the closest point to the newly selected viewing location.

15. The process of claim 13, further comprising a process action of whenever it is ascertained that the point closest to a currently selected viewing position is outside the wandering circle of any concentric mosaic and associated with the same image data source used to render the last previously-displayed image of the scene, the currently selected viewing location is automatically changed to coincide with the closest point associated with another image source.

16. The process of claim 1, wherein the virtual walkthrough space resides on a client of an interactive, client-server based computer network and the image data sources are provided by a server of the network, and wherein the process action of providing an image to the viewer, comprises the actions of:
    the client requesting image data from the server over the network;
    the server providing the requested image data to the client over the network; and
    the client displaying to the viewer an image depicting a portion of the surrounding scene, said image being rendered from image data received from the server.

17. The process action of claim 16, wherein the process action of the server providing the requested image data to the client, comprises the actions of:
    the server characterizing the image data as a plurality of image columns each of which depicts a part of the surrounding scene from a particular viewpoint within the scene and in a particular viewing direction; and
    the server transmitting the requested image data in the form of image columns.

18. The process of claim 17, wherein the viewer can additionally select a viewing direction for viewing the scene from the selected viewing position, and wherein the process action of the client requesting image data from the server, comprises an action of the client initially requesting from the server those image columns needed to render an image depicting a portion of the scene as viewed from a perspective at least nearly coinciding with a viewing position selected by the viewer and in a viewing direction selected by the viewer.

19. The process of claim 18, further comprising a process action of, once the image columns needed to render the image depicting a portion of the scene as viewed from the perspective at least nearly coinciding with the viewing position selected by the viewer and in the viewing direction selected by the viewer have been requested, the client requesting additional image columns which can be used to render an image depicting the remaining portion of the scene as viewed from said perspective at least nearly coinciding with the viewing position selected by the viewer, but from viewing directions other than the viewing direction selected by the viewer.

20. The process of claim 19, wherein the process actions of the client initially requesting from the server those image columns needed to render an image depicting a portion of the scene as viewed from a perspective at least nearly coinciding with a viewing position selected by the viewer and in a viewing direction selected by the viewer, and the client requesting additional image columns which can be used to render an image depicting the remaining portion of the scene as viewed from said perspective at least nearly coinciding with the viewing position selected by the viewer, but from viewing directions other than the viewing direction selected by the viewer, comprise an action of requesting the image columns from the center of said image outward, in an alternating pattern.

21. The process of claim 20, further comprising, whenever all the image columns needed to render an image of the surrounding scene from the currently selected viewing position and from any viewing direction have not yet been requested by the client, and the viewer selects a new viewing direction from the currently selected viewing position, the process actions of:

the client suspending additional requests for image columns associated with the portion of the scene in the direction opposite the direction from the previous selected viewing direction to the currently selected viewing direction; and the client sequentially requesting previously un-requested image columns associated with the surrounding scene in the same direction as the direction from the previous selected viewing direction to the currently selected viewing direction.

22. The process of claim 19, further comprising a process action of employing a full cache strategy comprising the process actions of:

the client requesting additional, previously un-requested image columns which can be used to render an image depicting the surrounding scene as viewed from a different viewing position and direction from the server once the image columns needed to render the image depicting a portion of the scene as viewed from the perspective at least nearly coinciding with the viewing position currently selected by the viewer and in any viewing direction selected by the viewer have been requested; and the client storing the additional image columns upon receipt from the server.

23. The process of claim 22, further comprising, whenever the viewer changes viewing position, the process actions of:

the client searching previously stored image columns for image columns needed to render an image depicting a portion of the scene as viewed from a perspective at least nearly coinciding with the newly selected viewing position before requesting them from the server;

the client requesting from the server any image column needed to render an image depicting a portion of the scene as viewed from a perspective at least nearly coinciding with the newly selected viewing position which was not found in the search of the stored columns; and the client rendering the image depicting a portion of the scene as viewed from a perspective at least nearly coinciding with the newly selected viewing position using the stored and requested image columns.

24. The process of claim 17, further comprising a process action of employing a partial cache strategy comprising the process actions of:

the client allocating two, equal sized buffers in the client's memory, each of which is large enough to store enough image columns to render an image of the surrounding scene from the currently selected viewing position and from any viewing direction;

the client requesting from the server those image columns needed to render an image depicting a portion of the scene as viewed from a perspective at least nearly coinciding with a viewing position selected by the viewer and in a viewing direction selected by the viewer;

the client requesting additional image columns which can be used to render an image depicting the remaining portion of the scene as viewed from said perspective at least nearly coinciding with the viewing position selected by the viewer, but from viewing directions other than the viewing direction selected by the viewer;

the client storing the requested image columns upon receipt in one of the two buffers, thereby making that buffer the active buffer.

25. The process of claim 24, wherein the process action of employing a partial cache strategy further comprises the actions of, whenever the viewer changes viewing position:

the client searching previously stored image columns for image columns needed to render an image depicting a portion of the scene as viewed from a perspective at least nearly coinciding with the newly selected viewing position before requesting them from the server;

the client requesting from the server any image column needed to render an image depicting a portion of the scene as viewed from a perspective at least nearly coinciding with the newly selected viewing position which was not found in the search of the stored columns;

the client copying any of the needed image column found in the stored columns, as well as storing those requested from the server upon receipt, in the inactive one of the two buffers;

the client designating the inactive buffer as the active buffer and designating the previously active buffer as the inactive buffer; and the client rendering the image depicting a portion of the scene as viewed from a perspective at least nearly coinciding with the newly selected viewing position using the image columns stored in the currently active buffer.

26. The process of claim 24, wherein, at a selected viewing position and direction, a viewer also selects a zoom level indicative of the desired lateral field of view of the viewer's image, and wherein the process action of employing a partial cache strategy further comprises the actions of, whenever the viewer zooms in:

the client increasing the size of the other inactive buffer in the client's memory so as to be large enough to store enough image columns to render an image of the surrounding scene from the currently selected viewing position from any viewing direction at the newly selected zoom level;

the client searching previously stored image columns in the active buffer for image columns needed to render an image depicting a portion of the scene as viewed at the newly selected zoom level before requesting them from the server;

the client requesting from the server any image column needed to render an image depicting a portion of the scene as viewed at the newly selected zoom level which was not found in the search of the stored columns;

the client copying any of the needed image column found in the active buffer, as well as storing those requested from the server upon receipt, in the inactive one of the two buffers;

the client designating the inactive buffer as the active buffer and designating the previously active buffer as the in active buffer; and the client rendering the image depicting a portion of the scene as viewed at the newly selected zoom level using the image columns stored in the currently active buffer.

27. The process of claim 24, wherein, at a selected viewing position and direction, a viewer also selects a zoom level indicative of the desired lateral field of view of the viewer's image, and wherein the process action of employing a partial cache strategy further comprises the actions of, whenever the viewer zooms out:

the client searching previously stored image columns in the active buffer for image columns needed to render an image depicting a portion of the scene as viewed at the newly selected zoom level before requesting them from the server;

the client requesting from the server any image column needed to render an image depicting a portion of the scene as viewed at the newly selected zoom level which was not found in the search of the stored columns;

the client copying any of the needed image column found in the active buffer, as well as storing those requested from the server upon receipt, in the inactive one of the two buffers;

the client designating the inactive buffer as the active buffer and designating the previously active buffer as the inactive buffer; and the client rendering the image depicting a portion of the scene as viewed at the newly selected zoom level using the image columns stored in the currently active buffer.

28. The process of claim 24, further comprising the client obtaining additional image columns which can be used to render an image depicting the surrounding scene as viewed from a different viewing position from the server once the image columns needed to render the image depicting a portion of the scene as viewed from the perspective at least nearly coinciding with the viewing position currently selected by the viewer and in any viewing direction selected by the viewer have been requested and stored in one of the two original buffers.

29. The process of claim 28, wherein the process action of obtaining additional image columns comprises the actions of the client:

(a) establishing a secondary buffer in the client's memory;

(b) selecting the nearest, previously-unselected point associated with a source of image data in relation to the currently selected viewing position;

(c) identifying the image columns that are needed to render an image depicting the surrounding scene as viewed from the selected point in any viewing direction;

(d) searching previously stored image columns for the identified image columns and noting the location in memory of any of the identified image columns found in the search;

(e) requesting from the server any of the identified image columns which were not found in the search of the stored columns; and (f) storing the identified image columns requested from the server in the secondary buffer upon their receipt.

30. The process of claim 29, further comprising a process action of copying any of the identified image columns found in the search into the secondary buffer.

31. The process of claim 29, further comprising repeating process actions (a) through (f) whenever there is sufficient memory space available in the client to establish another secondary buffer.

32. The process of claim 17, further comprising the process actions of:

the client ascertaining if a requested image column is not received from the server over the network; and the client employing a copy of an adjacent image column in lieu of the missing image column to render the viewer's image.

33. The process of claim 17, further comprising the process actions of:

the client ascertaining if a requested image column is not received from the server over the network;

the client blending the two image columns adjacent the missing image column to create a substitute image column; and the client employing the substitute image column in lieu of the missing image column to render the viewer's image.

34. An interactive, client-server based computer network for providing a walkthrough environment in which images of a surrounding scene are displayed to a viewer associated with the client, comprising:

a client comprising at least one general purpose computing device; and a computer program comprising program modules executable by the client, wherein the client is directed by the program modules to, present a virtual walkthrough space to the viewer in which the viewer can select viewing parameters for viewing the scene;

ascertain current viewing parameters selected by the viewer, said viewing parameters comprising at least a viewing position and viewing direction within the walkthrough space;

transmit at least the current viewing position to the server over the network;

receive from the server over the network descriptive information concerning a source of image data associated with a point in the walkthrough space that is closest to the current viewing position, wherein a source of image data comprises image data from which an image of a part or all of the surrounding scene as viewed from one or more points in the walkthrough space can be rendered, and wherein the descriptive information comprises an indicator of the type of image data and information needed to selectively request portions of the image data and to render an image therefrom, request the image data needed to render an image depicting at least a part of the scene as would be viewed from the coordinates of the closest source point in the current viewing direction from the server over the network in a prescribed order, receive over the network the requested image data transmitted by the server, use the received image data to render the viewer's image.

35. The network of claim 34, wherein the descriptive information further comprises the walkthrough space coordinates of the closest source point, and wherein the computer program further comprises program modules for:

determining whether the coordinates of the closest source point are different from the current viewing position; and whenever it is determined the coordinates of the closest source point are different from the current viewing position, designate the closest source point coordinates as the current viewing position.

36. The network of claim 34, wherein the requested image data is received in a compressed form, and wherein the program module for receiving descriptive information concerning the source of image data comprises a sub-module for receiving in the descriptive information, information needed for the client to decompress the compressed image data, and wherein the computer program further comprises a program module for decompressing the requested image data upon its receipt using the decompression information received with the descriptive information.

37. The network of claim 34, wherein the viewing parameters further comprise a viewer selected zoom level indicative of the desired lateral field of view of the viewer's image, and wherein the program module for ascertaining the current viewing parameters selected by the viewer comprises a sub-module for ascertaining the selected zoom level, and wherein the program module for requesting the image data comprises a sub-module for requesting the image data needed to render an image depicting at least a part of the scene as would be viewed from the coordinates of the closest source point in the current viewing direction from the server and at the selected zoom level, over the network in a prescribed order.

38. The network of claim 37, wherein the image data sources comprise at least one of (i) pictures each representing a part of the surrounding scene as would be viewed from a capture point of the picture, (ii) panoramas each representing the surrounding scene as would be viewed from a capture point of the panorama, and (iii) concentric mosaics comprising image data from which an image of the surrounding scene can be rendered as would be viewed from any point within a wandering circle of the concentric mosaic.

39. The network of claim 38, wherein the closest source point is associated with a picture according to the received descriptive information, and wherein the computer program further comprises program modules for:
    determining whether the viewer's image can be rendered given the selected zoom level and viewing direction using the image data associated with the picture;
    whenever it is determined the viewer's image cannot be rendered from the picture image data given the selected zoom level and viewing direction, informing the viewer that the selected viewing direction or zoom level, or both, is unavailable at the currently selected viewing position and inviting the viewer to select a different viewing direction and/or zoom level or to select a different viewing position.

40. The network of claim 34, wherein the image data comprises a plurality of image columns each depicting a columnar part of the scene.

41. The network of claim 40, wherein the prescribed order of requesting image data is to request the image columns that are needed to render the image being presented to the viewer from the center of this image outward, in an alternating pattern.

42. The network of claim 41, wherein each image column associated with an image data source point in the walkthrough space is assigned a different index number, and wherein the process action of requesting image data comprises an action of requesting the image columns needed to render the image being presented to the viewer by their index numbers.

43. An interactive, client-server based computer network for providing a walkthrough environment in which images of a surrounding scene are displayed to a viewer associated with the client, comprising:
    a server comprising at least one general purpose computing device; and
    a computer program comprising program modules executable by the server, wherein the server is directed by the program modules to,
        define a virtual walkthrough space in which the viewer can select viewing parameters comprising a viewing position on a viewing plane therein and a viewing direction for viewing the scene;
        divide the viewing plane of the walkthrough space into a sectioned grid comprising a plurality of cells;
        assign to each cell of the grid at least one source of image data from which a view of a part or all of the surrounding scene as viewed from that cell can be rendered, wherein each of said image data sources assigned to a cell is associated with at least one point within the cell; and
        receive from a client over the network a set of viewer-selected, current viewing parameters comprising at least a viewing position within the walkthrough space;
        determine in which cell the current viewing position resides,
        ascertain which of the points associated with data sources assigned to the cell containing the selected position and any directly adjoining cell is closest to the current viewing position,
        transmit to the client over the network descriptive information concerning the source of image data associated with the point in the walkthrough space that is closest to the current viewing position, wherein the descriptive information comprises an indicator of the type of image data and information needed for the client to selectively request portions of the image data and to render an image therefrom,
        receive requests from the client over the network for image data needed to render an image depicting at least a part of the scene as would be viewed from the current viewing position in the current viewing direction, and
        transmit the requested image data to the client over the network.

44. The network of claim 43, wherein the program module for transmitting descriptive information concerning the source of image data comprises a sub-module for including the walkthrough space coordinates of the closest source point in the descriptive information.

45. The network of claim 43, wherein the program module for transmitting descriptive information concerning the source of image data comprises a sub-module for transmitting the requested image data in the order requested by the client.

46. The network of claim 43, further comprising a program module for compressing the requested image data prior to transmitting it to the client, and wherein the program module for transmitting descriptive information concerning the source of image data comprises a sub-module for including in the descriptive information, information needed for the client to decompress the compressed image data.

47. The network of claim 44, wherein the program module for compressing the requested image data comprises a sub-module for compressing the image data using a vector quantization technique.

48. The network of claim 43, wherein the image data comprises a plurality of image columns each depicting a columnar part of the scene, and wherein each image column associated with an image data source point in the walkthrough space is assigned a different index number, and wherein the process action of receiving requests from the client for image data comprises an action of receiving the requests in the form of index numbers identifying the particular image columns that are to be transmitted to the client.

49. A computer-readable medium having computer-executable instructions for providing image data, said computer-executable instructions comprising:
    defining a virtual walkthrough space in which the viewer can select viewing parameters comprising a viewing position on a viewing plane therein and a viewing direction for viewing the scene;

dividing the viewing plane of the walkthrough space into a sectioned grid comprising a plurality of cells;

assigning to each cell of the grid at least one source of image data from which a view of a part or all of the surrounding scene as viewed from that cell can be rendered, wherein each of said image data sources assigned to a cell is associated with at least one point within the cell;

inputting the viewer's current viewing parameters comprising at least a viewing position within the walkthrough space;

determining in which cell the current viewing position resides;

ascertaining which of the points associated with data sources assigned to the cell containing the selected position and any directly adjoining cell is closest to the current viewing position;

outputting descriptive information concerning the source of image data associated with the point in the walkthrough space that is closest to the current viewing position, wherein the descriptive information comprises an indicator of the type of image data and information needed to selectively request portions of the image data and to render an image therefrom;

inputting requests for image data needed to render an image depicting at least a part of the scene as would be viewed from the current viewing position in a currently selected viewing direction, and outputting the requested image data.

50. A computer-readable medium having computer-executable instructions for providing images of a surrounding scene to a viewer, said computer-executable instructions comprising:

presenting a virtual walkthrough space to the viewer in which the viewer can select viewing parameters for viewing the scene;

ascertaining current viewing parameters selected by the viewer, said viewing parameters comprising at least a viewing position and viewing direction within the walkthrough space;

outputting the current viewing position;

inputting descriptive information concerning a source of image data associated with a point in the walkthrough space that is closest to the current viewing position, wherein a source of image data comprises image data from which an image of a part or all of the surrounding scene as viewed from one or more points in the walkthrough space can be rendered, and wherein the descriptive information comprises an indicator of the type of image data and information needed to selectively request portions of the image data and to render an image therefrom, outputting requests for the image data needed to render an image depicting at least a part of the scene as would be viewed from the coordinates of the closest source point in the current viewing direction in a prescribed order, inputting the requested image data, using the received image data to render the viewer's image.

* * * * *

UNITED STATES PATENT AND TRADEMARK OFFICE
CERTIFICATE OF CORRECTION

PATENT NO.    : 6,633,317 B2
DATED         : October 14, 2003
INVENTOR(S)   : Li et al.

It is certified that error appears in the above-identified patent and that said Letters Patent is hereby corrected as shown below:

Column 20,
Line 18, "$|\Delta\phi_{fovu}$" should be changed to -- $|\Delta\phi_{fovu}|$ --

Signed and Sealed this

Ninth Day of December, 2003

JAMES E. ROGAN
*Director of the United States Patent and Trademark Office*